United States Patent [19]

Porter, III et al.

[11] Patent Number: 5,061,299
[45] Date of Patent: Oct. 29, 1991

[54] AIR/GAS/MICRO PARTICAL POLLUTION CONTROL SYSTEM

[76] Inventors: Sidney D. Porter, III, 5407 SE. 62nd Ave., Portland, Oreg. 97206; Leroy E. Denny, 647 NE. 178th Ave, Portland, Oreg. 97230

[21] Appl. No.: 501,242

[22] Filed: Mar. 29, 1990

[51] Int. Cl.[5] .............................................. B01D 47/00
[52] U.S. Cl. .......................................... 55/86; 55/91; 55/93; 55/95; 55/122; 55/237; 55/247; 55/248; 55/256; 55/272; 55/317; 55/319; 55/408
[58] Field of Search ................. 55/86, 91, 93, 95, 122, 55/237, 247, 248, 256, 267, 272, 317, 319, 408

[56] References Cited

U.S. PATENT DOCUMENTS

| | | | |
|---|---|---|---|
| 2,007,759 | 7/1935 | Harmon | 55/235 |
| 2,102,353 | 12/1937 | Brock | 55/317 |
| 2,221,572 | 11/1940 | Brock et al. | 55/248 |
| 2,945,553 | 7/1960 | Brock | 55/248 |
| 2,991,844 | 7/1961 | Nomar | 55/408 |
| 3,299,621 | 1/1967 | Panzica et al. | 55/239 |
| 3,347,535 | 10/1967 | Schimpke | 55/235 |
| 3,406,504 | 10/1968 | Sylvan | 55/408 |
| 3,480,262 | 11/1969 | Himel | 55/256 |
| 3,538,657 | 11/1970 | Macrow | 55/408 |
| 3,557,535 | 1/1971 | Howick | 55/237 |
| 3,683,594 | 8/1972 | Schoun | 55/260 |
| 3,702,048 | 11/1972 | Howick | 55/239 |
| 3,729,901 | 5/1973 | Jackson | 55/256 |
| 4,640,697 | 2/1987 | Erickson, Jr. | 55/248 |
| 4,673,422 | 6/1987 | Tidwell | 55/248 |
| 4,690,697 | 9/1987 | Schwartz et al. | 55/220 |
| 4,693,734 | 9/1987 | Erickson, Jr. | 55/248 |
| 4,851,017 | 7/1989 | Erickson et al. | 55/256 |

Primary Examiner—Jay H. Woo
Assistant Examiner—C. Scott Bushey
Attorney, Agent, or Firm—Lee R. Schermerhorn

[57] ABSTRACT

Contaminated hot gases are first cooled and then the flow is divided between a plurality of identical modules for removal or contaminants. There are two stages of treatment in each module, starting with submergence of the flow under the surface of an agitated liquid neutralizing solution in a reservoir under a pair of counter rotating separator deflectors. Above the deflectors the flow is propelled upward through a venturi restrictor chamber, then into a collector pressure chamber. This completes the first stage of treatment, the second stage being the same as the first stage. Between these first and second stages the flow is passed through an electronic air cleaner. Upon leaving the second stage of treatment the cleaned gas flow joins the flows from the other modules in a fresh air distributor. Filters are provided for the liquid neutralizing solutions and nozzles for washing, rinsing and drying the separator deflectors, these elements being controlled so that no more than one module is taken out of operation at any time.

34 Claims, 18 Drawing Sheets

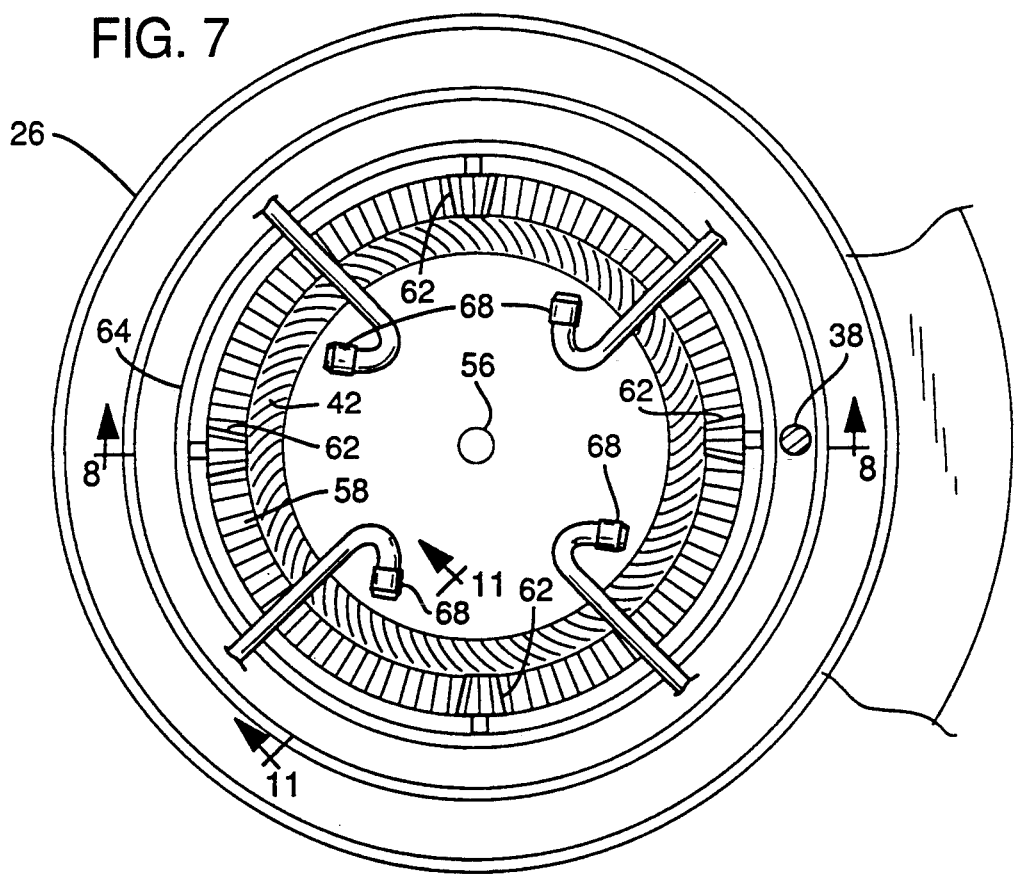
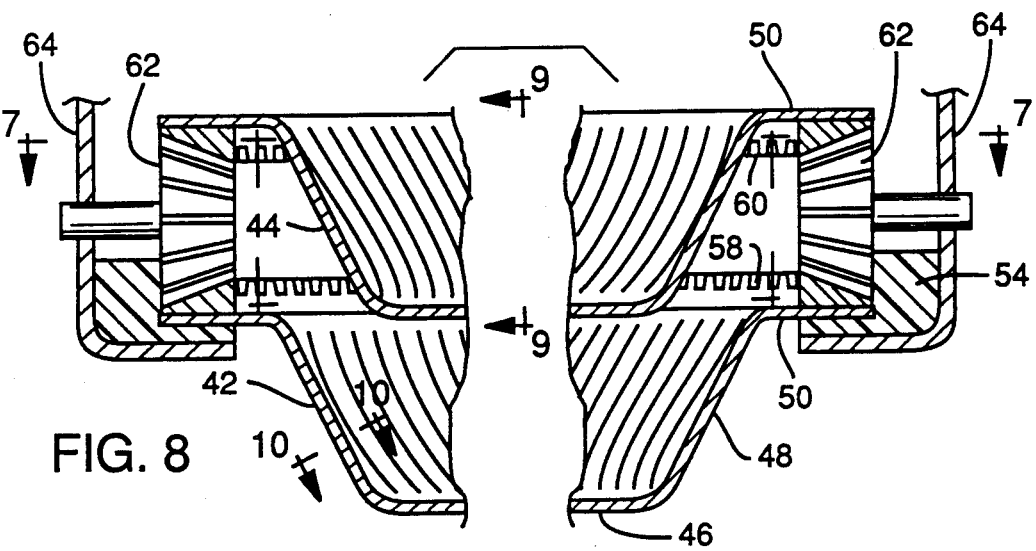

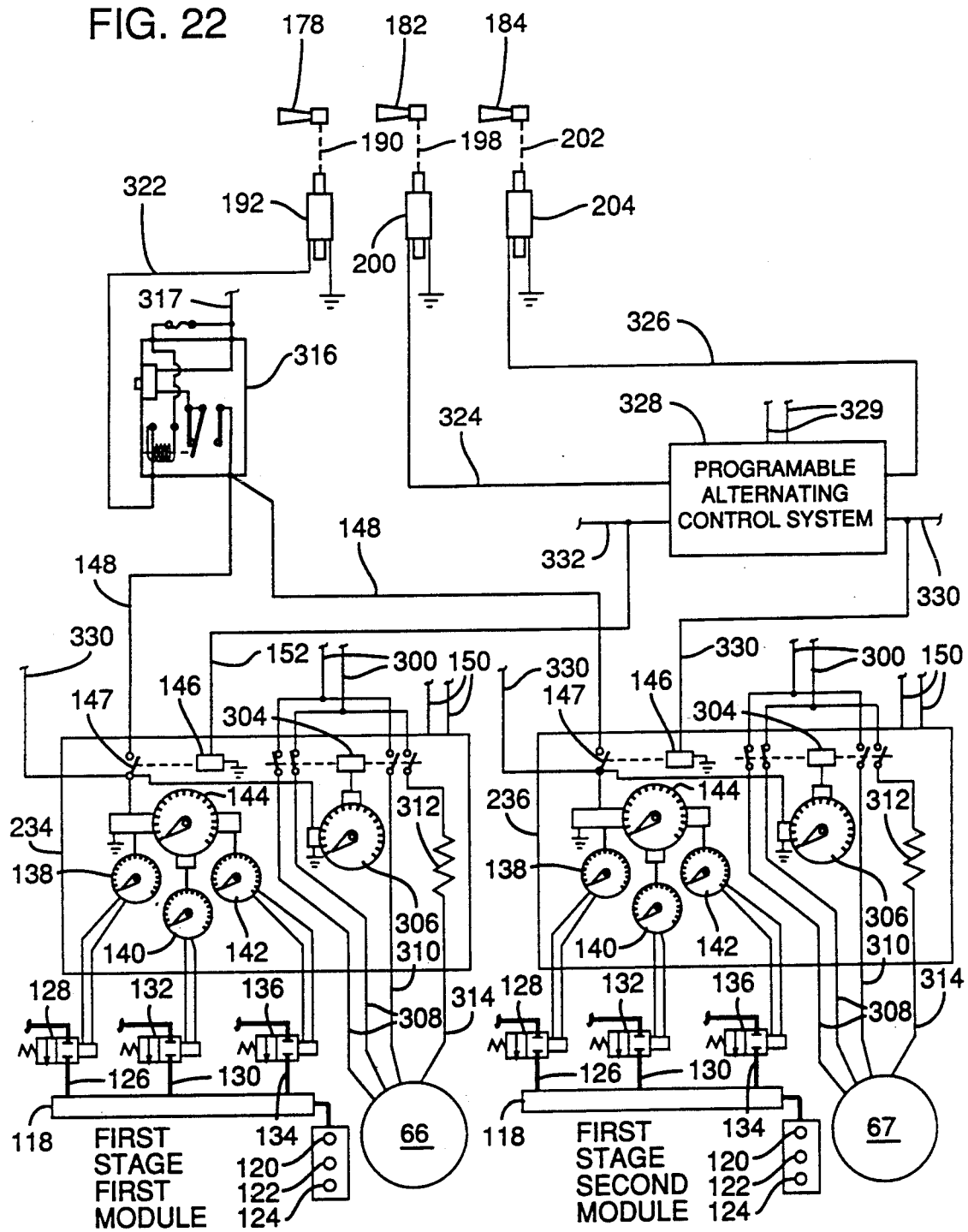

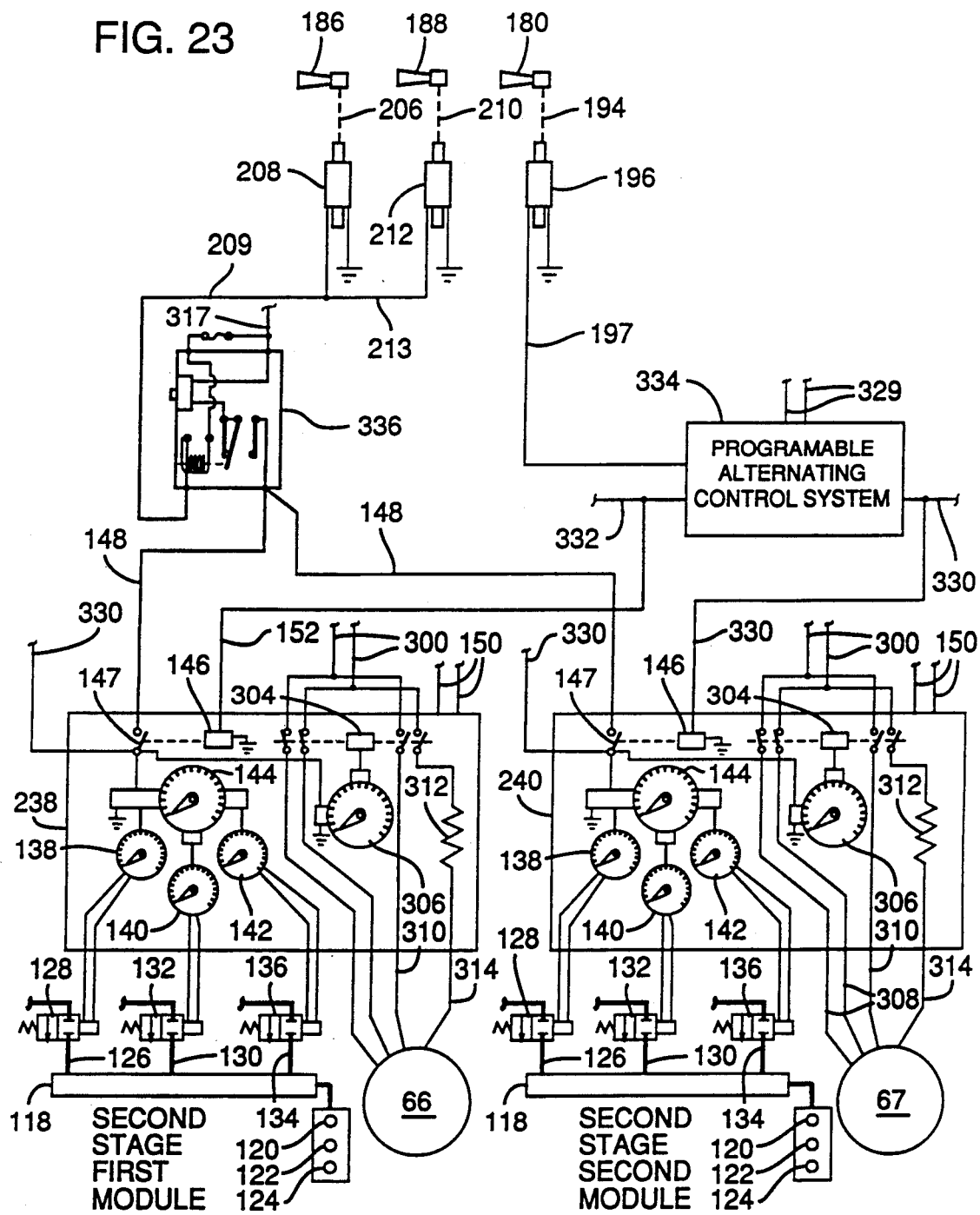

AIR/GAS/MICRO PARTICAL POLLUTION CONTROL SYSTEM

BACKGROUND OF THE INVENTION

This invention relates to a pollution control system for air or gas, or air or gas containing microparticles such as smoke.

Air pollution is a long-standing menace particularly in regard to foundry operations, various manufacturing industries, field burning and exhaust from power plants and internal combustion engines where the exhausts are released to the atmosphere.

In addition to particulates such as smoke and dust the most objectionable polluting gases are sulfur dioxide, hydro-carbons, oxides of nitrogen, methane, freons, carbon dioxide, carbon monoxide, methyl chloroform and carbon tetrachloride.

Various types of pollution control devices exist in the prior art. Schwartz U.S. Pat. No. 4,690,697 describes a system in which hot flue gas is cooled before passing it to an enclosure for removing noxious gases. Two such enclosures are provided allowing the gas flow to be transferred from one to the other.

Jackson U.S. Pat. No. 3,729,901 describes pollutant recovery apparatus in which exhaust gases are bubbled through liquid in one or the other of two tanks so that one tank may be cleaned while the other is operating to collect contaminants.

Schimpke U.S. Pat. No. 3,347,535 describes a gas-liquid contact apparatus having two air washer housings mounted side-by-side on a single liquid tank.

Schouw U.S. Pat. No. 3,683,594 describes a modular fume scrubber having three modules, one on top of the other and connected in parallel to triple the capacity of the system without increasing the required floor space required for a single unit.

Panzica U.S. Pat. No. 3,299,621; Howick U.S. Pat. No. 3,557,535; Howick U.s. Pat. No. 3,702,048 and Harmon U.S. Pat. No. 2,007,759 describe air gas washers having an upward flow through spray generators, impeller blades and baffles.

These devices do not have the capability to accomplish a "no detection" result. They may be effective to a certain extent but lack the ability to completely remove the contaminant.

SUMMARY OF THE INVENTION

In the present system a plurality of modules is provided so that the operation of any one module may be interrupted for cleaning without impairing the operation of the rest of the system. Hot air or gases are first cooled to a suitable temperature and then submerged in a liquid neutralizing solution in a reservoir under the module. The liquid is agitated by an oscillating vane agitator.

The air/gas flow emerging from the liquid is drawn through a pair of counterrotating separator deflectors which remove droplets of liquid and particulate matter. This upward movement of the air/gas stream is produced by a plurality of counterrotating propellers in a tapered venturi restrictor chamber beneath a collector pressure chamber. The reservoir, agitator, separator deflector elements, propellers and venturi chamber and the collector pressure chamber constitute a first stage of the module.

From the collection pressure chamber of the first stage of the module the air/gas is passed through an electronic separator and thence into a second stage of the module having all the elements described in the first stage. The cleaned air/gas is then discharged from the second stage into a fresh air distributor, then to open space or channeled into a factory fresh air system.

Nozzles are provided for applying wash water, rinse water and drying air to the separator deflectors in a cleaning cycle. During the cleaning cycle the rotation speed of the separator deflectors is reduced to a slow speed. These operations in the cleaning cycle are controlled by a motor speed resistor control, a master automatic reset timer and three secondary automatic reset timers.

Initiation of the cleaning cycle is controlled by an air venturi in the inlet to the module and an air venturi in the air/gas flow out of the collector pressure chamber, through vacuum sensors responsive to said venturis. The vacuum sensors are adjusted to the altitude above or depth below mean sea level. At the completion of the wash, rinse and air dry operations the rotation of the separator deflectors is returned to normal operating speed.

During a cleaning cycle in one of the modules the remaining modules continue in operation so that the operation of the system is not interrupted. The effectiveness of the system has been reliably tested and qualifies under a "no detection" rating.

The invention will be better understood and the foregoing features and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

BRIEF DESCRIPTION OF THE DRAWINGS

FIG. 7 is a sectional view on the line 7—7 in FIG. 8. FIG. 8 is a sectional view on the line 8—8 in FIG. 7.

FIG. 22 is a diagram of details in the control system for the first stage in both modules in FIG. 21.

FIG. 23 is a diagram of details in the control system for the second stage in both modules in FIG. 21.

DESCRIPTION OF THE PREFERRED EMBODIMENT

Figure 1:
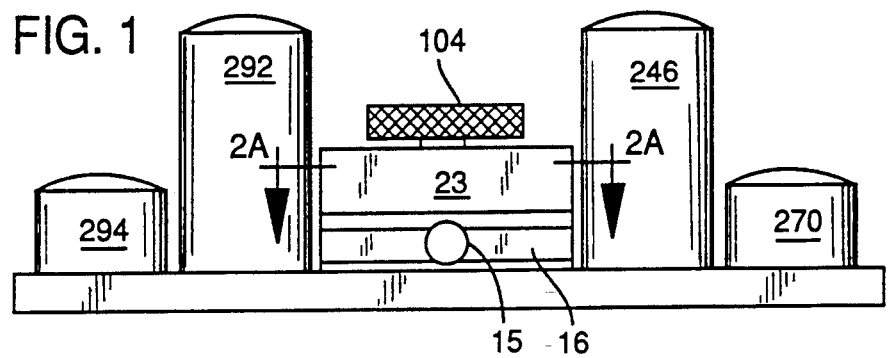
FIG. 1 is a front elevation view of a system according to the invention having two modules.
Figure 2A:
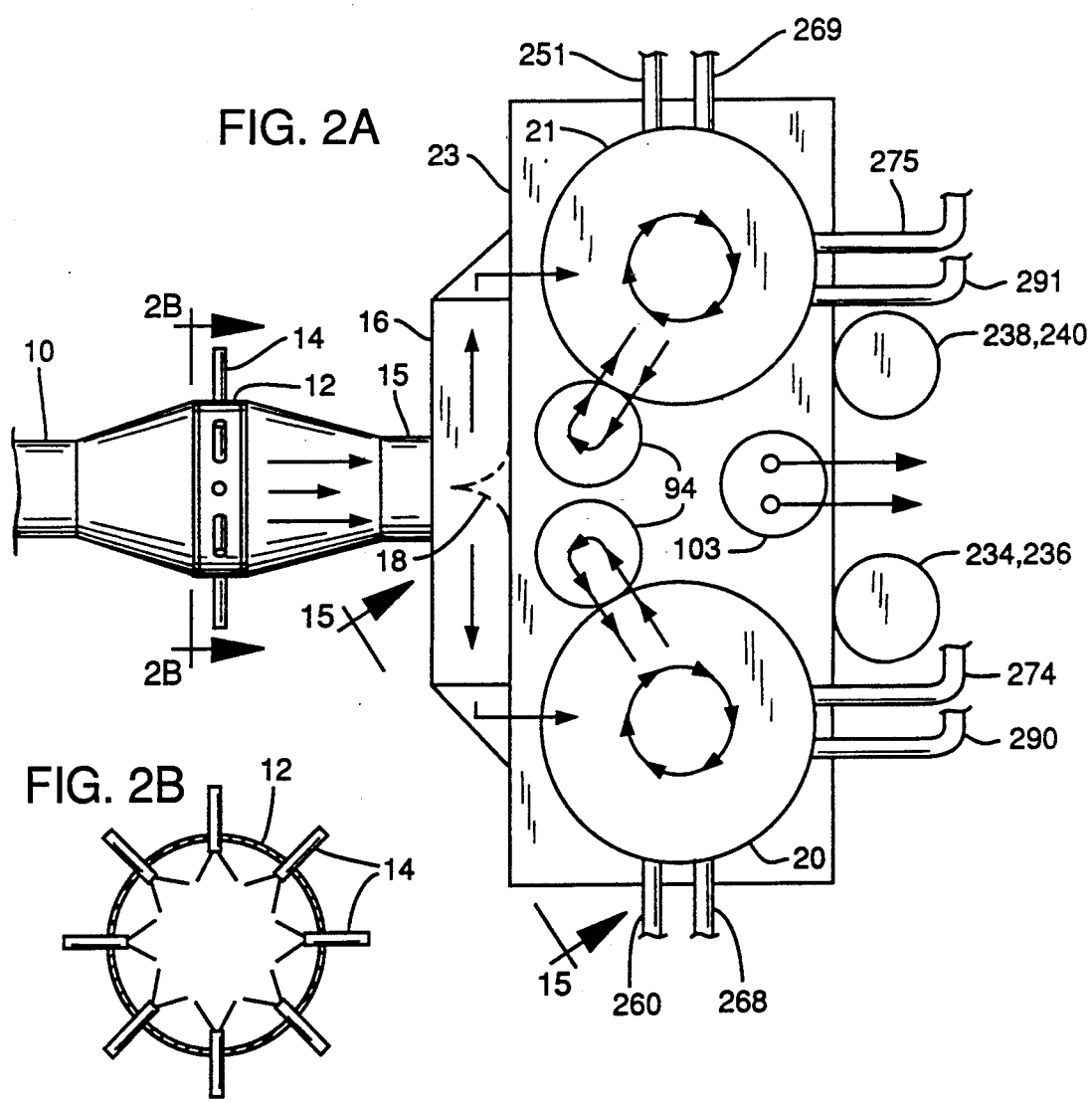
FIG. 2A is a schematic view on the line 2A—2A in FIG. 1 showing air flow patterns in the system.
Figure 2B:
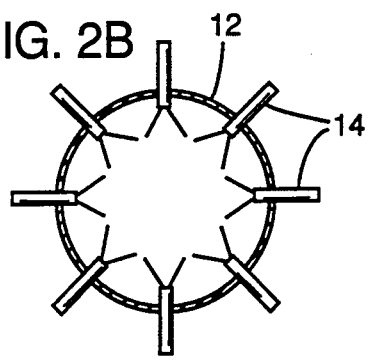
FIG. 2B is a view on the line 2B—2B in FIG. 2A.

Referring first to FIGS. 2A and 2B, the contaminated air or gas, if it is at a high temperature, is introduced through a pipe or tube 10 to a cooling unit 12. Cold air is supplied to cooling unit 12 by a plurality of vortex tubes 14. Vortex tubes 14 are manufactured by the Vortec Corporation in Cincinnati, Ohio. In a typical operation air/gas at a temperature of 350° F. is cooled to a temperature in the range of 90° F., to 80° F.

Figure 3:
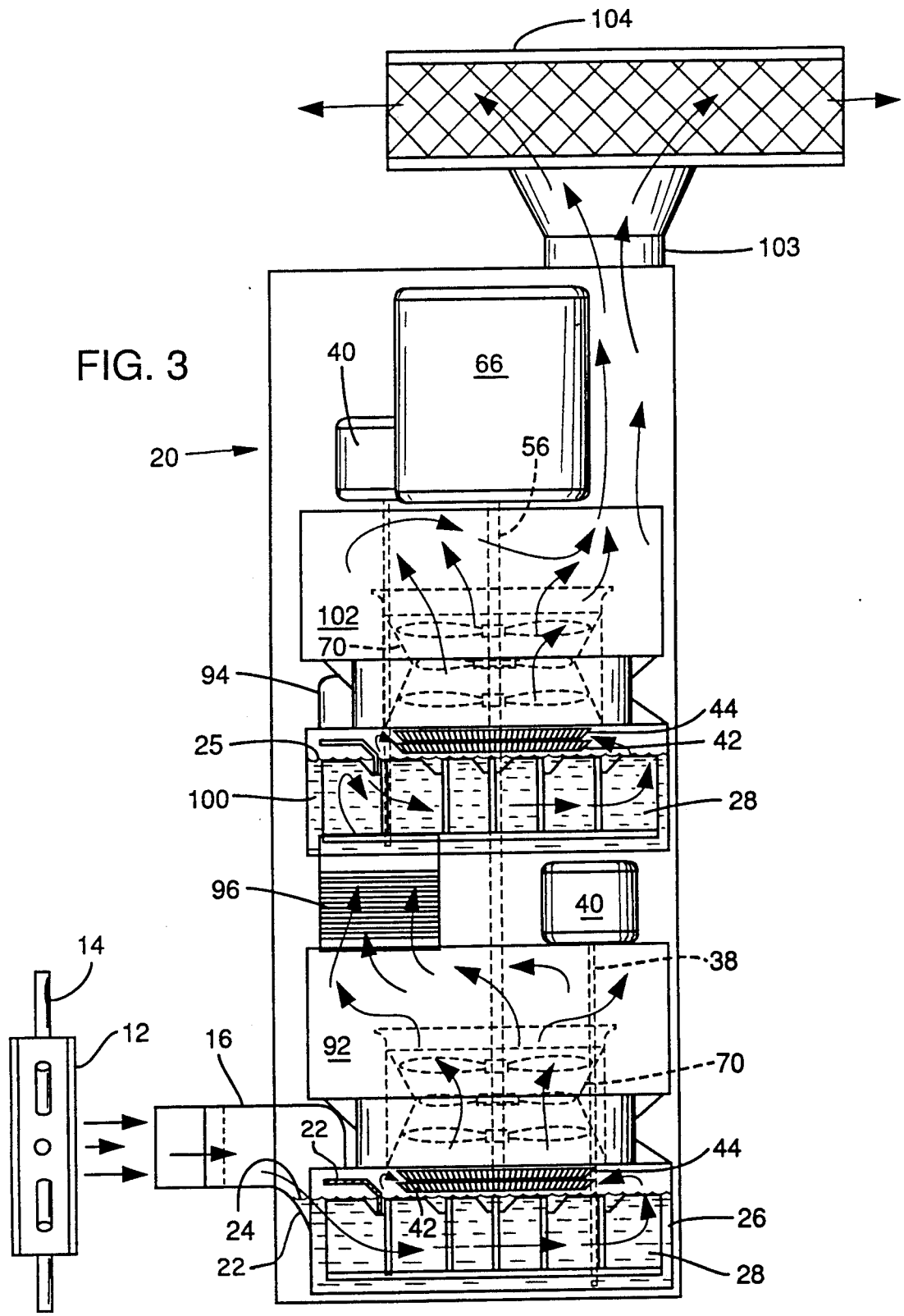
FIG. 3 is a vertical sectional view showing the air flow pattern through one of the modules.

The cooled air or gas is then drawn into the system inlet 15, 16, and divided by flow divider 18 to flow into the two modules 20 and 21 in housing 23. A passageway 22 directs the incoming air/gas flow downward under the surface 24 of a liquid neutralizing solution in reservoir 26 in each module as seen in FIGS. 3 and 4A relating to module 20.

The composition of this solution depends upon the nature of the contaminants. It may be plain water. It may contain synthetic wetting agents, detergents, emulsifiers, aminos, water soluble solvents, biodegradable composition water, baking soda and related types, enzymes, etc.

Figure 4A:
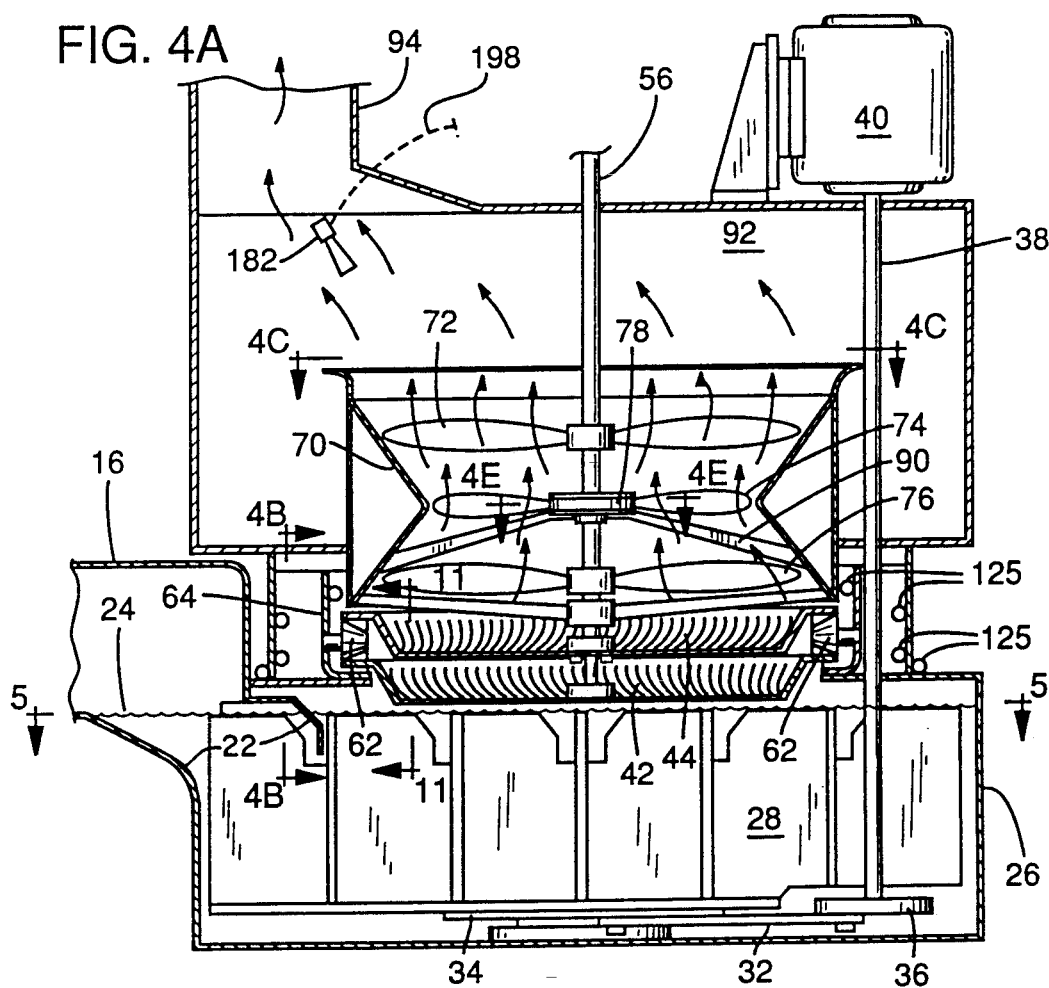
FIG. 4A is an enlarged view of the first stage in the lower part of the module in FIG. 3.
Figure 4B:
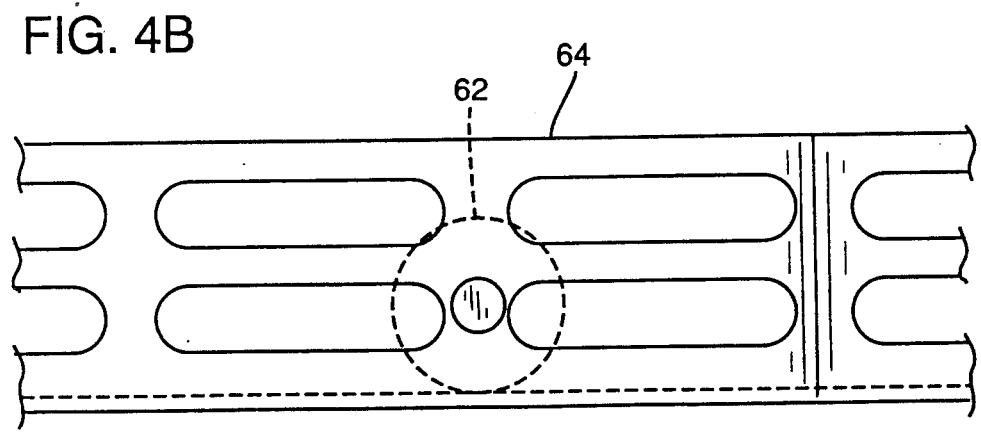
FIG. 4B is an enlarged view on the line 4B—4B in FIG. 4A.
Figure 4C:
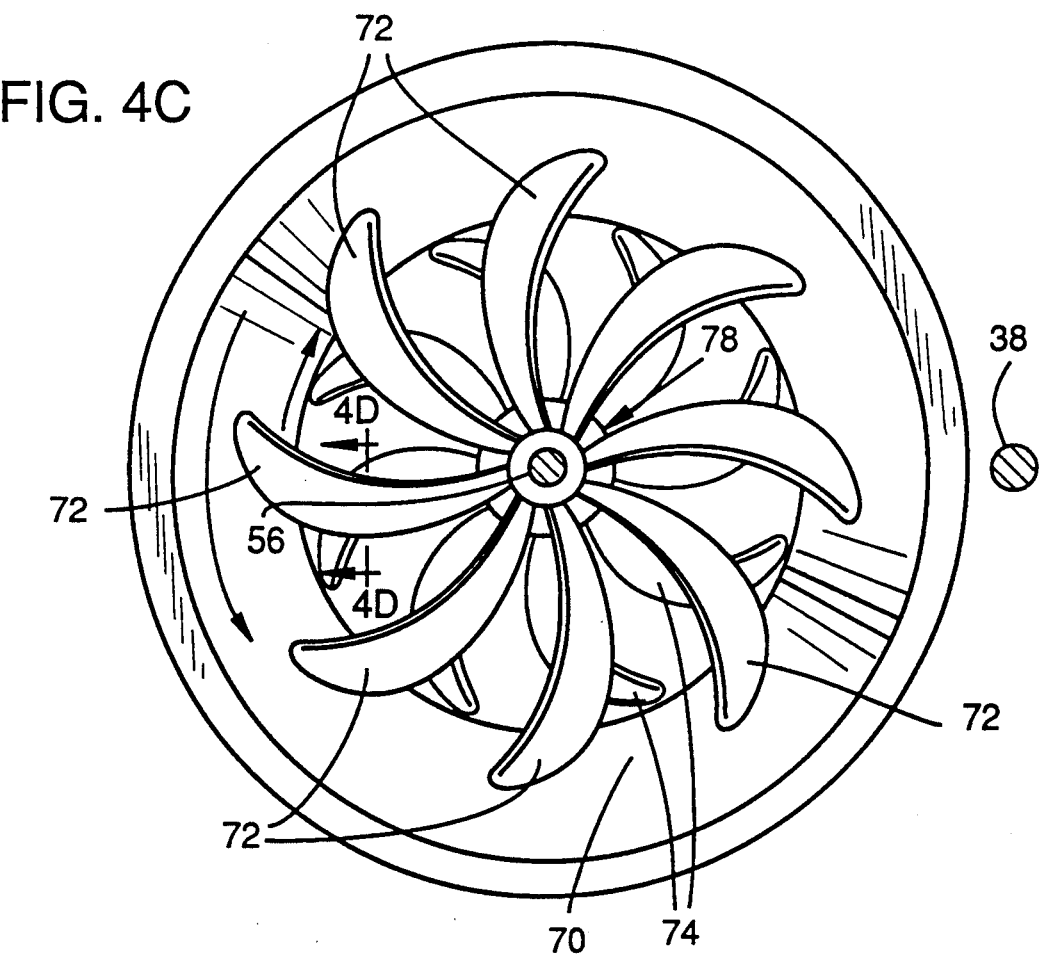
FIG. 4C is an enlarged view on the line 4C—4C in FIG. 4A.
Figure 5:
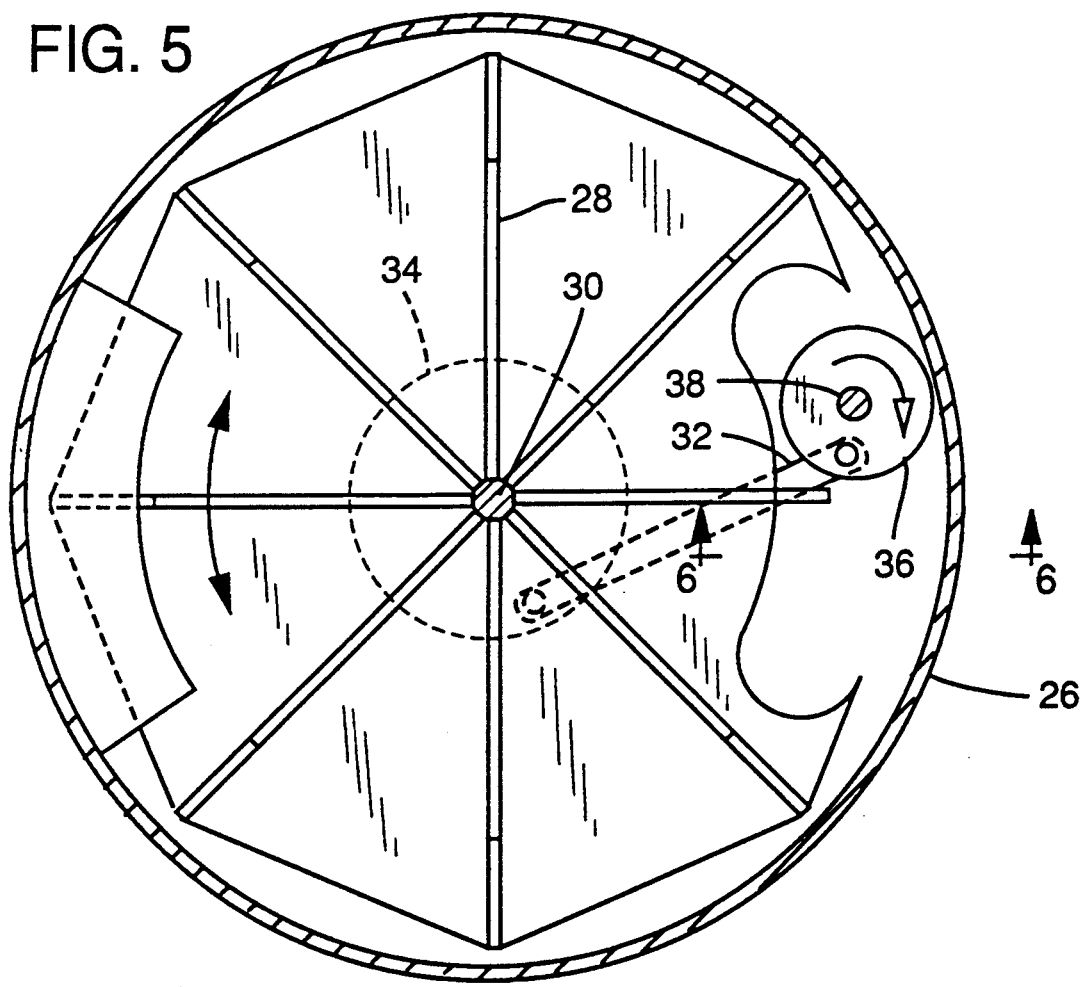
FIG. 5 is an enlarged sectional view on the line 5—5 in FIG. 4A.

Reservoir 26 contains an oscillating vane agitator 28 mounted on the vertical shaft 30 in FIG. 5. The agitator is oscillated by a link 32 connected at one end to a pin in a disc 34 on the agitator and connected at the other end to a pin in a disc 36 on a shaft 38 driven by the motor 40 in FIG. 4A.

Figure 9:
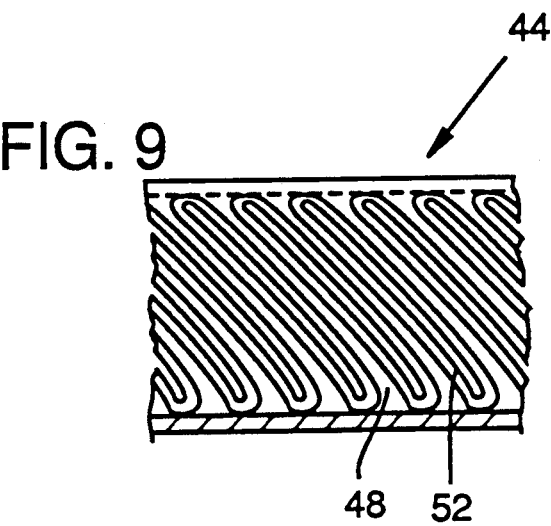
FIG. 9 is a view on the line 9—9 in FIG. 8.
Figure 10:
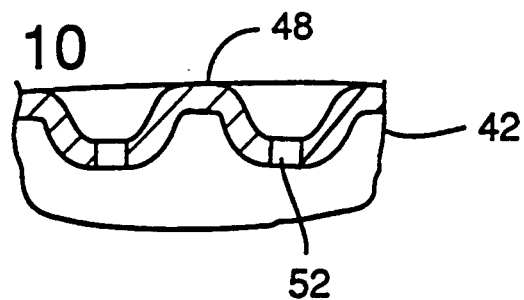
FIG. 10 is a sectional view on the line 10—10 in FIG. 8.

Above the surface 24 of the liquid in reservoir 26 in FIG. 4A are lower and upper counter rotating separator deflectors 42 and 44 shown in greater detail in FIGS. 7-11. Each of these separator deflectors is pan shaped with a flat imperforate bottom plate 46, an outwardly sloping side wall 48 and a flat horizontal peripheral rim 50. The side wall 48 is corrugated as shown in FIG. 10 and slotted at 52 as shown in FIGS. 9 and 10. These slots are from 0.007 to 0.015 inch in width in a typical example.

These corrugations and slots are inclined as shown in FIG. 9 to act as fins for propelling the air/gas inward and downward through the side wall 48 when the separator deflector is rotated. Since the two separator deflectors 42, 44 rotate in opposite direction the corrugations and slots in lower separator deflector 42 are inclined in a direction opposite to the inclination for the upper separator deflector 44 shown in FIG. 9.

The lower separator deflector 42 is supported by its rim 50 on the bearing block 54 in FIG. 8 and the upper separator deflector 44 is supported and rotated by shaft 56 in FIG. 4A. As seen in FIG. 8 the rim 50 of the lower separator deflector has teeth 58 on the upper side of its rim 50 and the upper separator deflector 44 has teeth 60 on the underside of its rim 50. Four idler pinion gears 62 supported by a slotted peripheral jacket 64 engage these gear teeth to rotate the lower separator deflector 42 in the opposite direction of rotation relative to the upper separator deflector 44, as shown in FIGS. 8 and 9. Shaft 56 is driven by the motor 66 in FIG. 3 at a typical speed of 3600 r.p.m.

The counter rotation of the two separator deflectors produces a sharp shearing effect on the upward air/gas flow which is very effective in removing fine particulates.

The separator deflectors 42 and 44 are washed, rinsed and air dried by the nozzles 68 in FIGS. 7 and 11 in a cleaning cycle to be described hereinafter.

Above the separator deflectors 42, 44 the air/gas flow is propelled through tapered venturi restrictor chamber 70 by three propellers 72, 74 and 76 on the shaft 56 as seen in FIG. 4A. Propellers 72 and 76 are connected directly to this shaft while propeller 74 is driven in the opposite direction of rotation by the reversing gear unit 78 shown in FIG. 4E.

Propeller blades 74 are mounted on an outer ring hub 80 which is driven through pinion gears 82 from gear 84 on the shaft 56, the pinions 82 being mounted for rotation on studs 86 in stationary cover plates 88, the lower one of which is supported by brackets 90 mounted on the wall of chamber 70. The air/gas flow from venturi restrictor chamber 70 establishes a desired pressure in collector pressure chamber 92 in FIG. 4A.

Figure 4D:
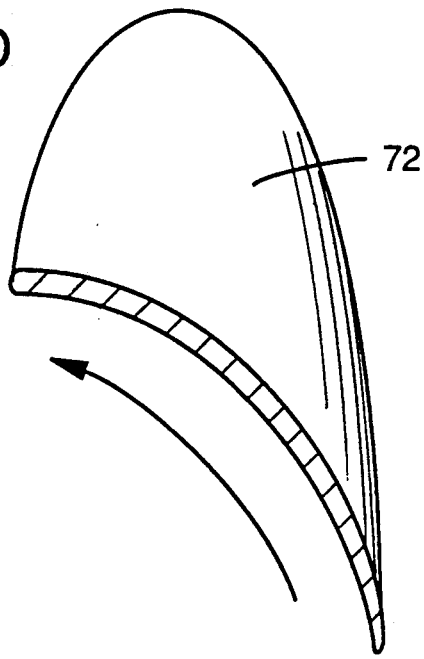
FIG. 4D is a sectional view on the line 4D—4D in FIG. 4C.

The propellers 72, 74 and 76 are designed for high efficiency quiet operation with curved blades as shown in FIG. 4D. Again, the counter rotation of the three propellers produces sharp shearing effects on the upward air/gas gas flow which is effective in removing fine particulates.

Figure 15:
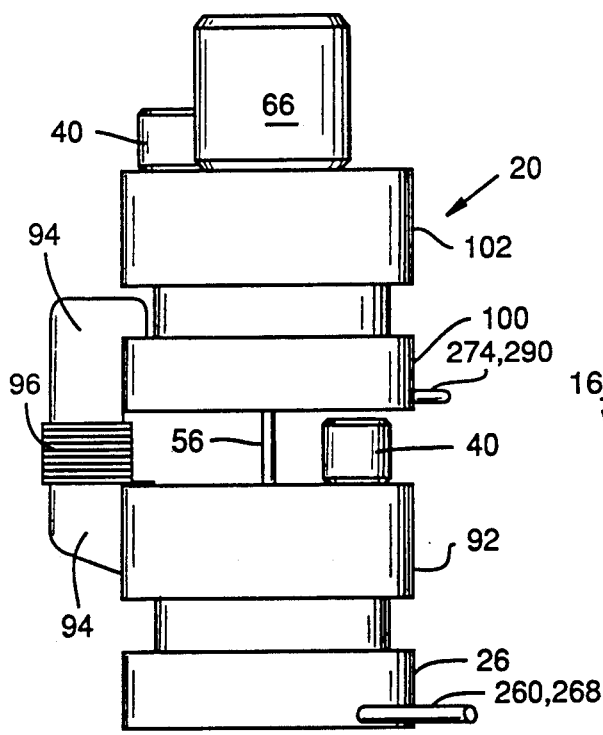
FIG. 15 is a view on the line 15—15 in FIG. 2A.
Figure 15A:
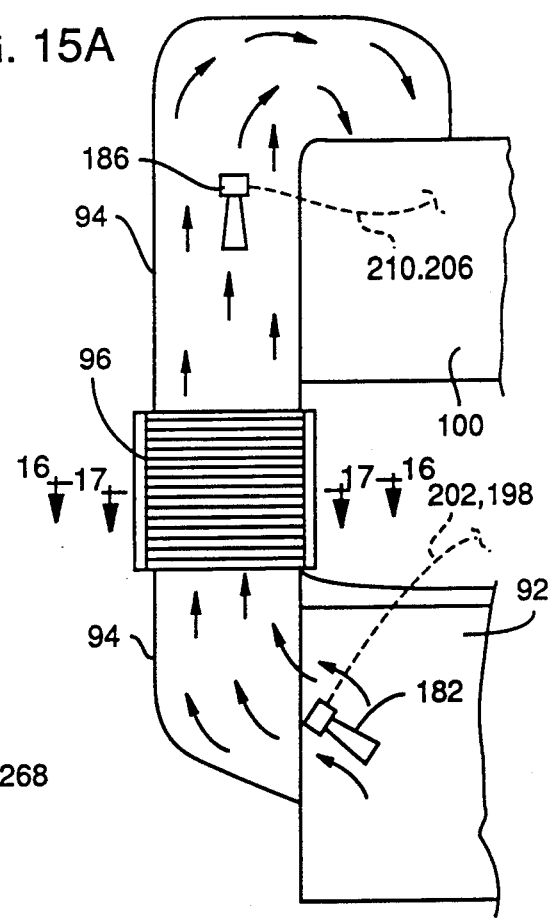
FIG. 15A is an enlarged sectional view through a portion of FIG. 15.
Figure 16:
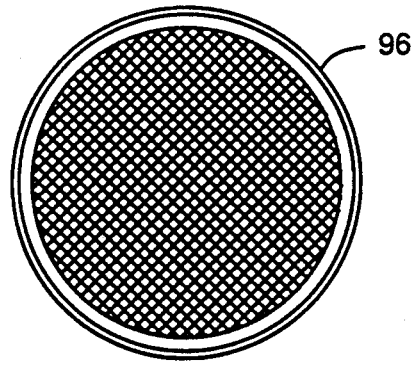
FIG. 16 is an enlarged sectional view on the line 16—16 in FIG. 15A.
Figure 17:
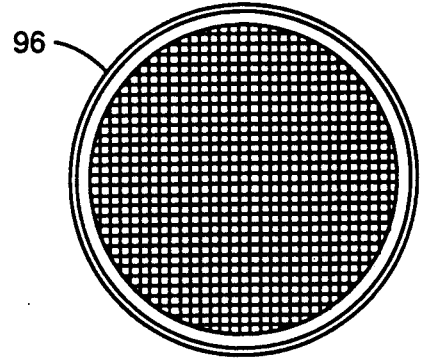
FIG. 17 is an enlarged sectional view on the line 17—17 in FIG. 15A.

Collector pressure chamber 92 discharges through a passageway 94 to an electronic filter 96 as shown in FIGS. 15 and 15A. This filter has sections of grid wires oriented in different directions relative to each other as shown in FIGS. 16 and 17. Suitable electronic filters for this purpose are made by Honeywell in North Golden Valley, Minn. The cross section of passageway 94 is smaller than the cross section at the narrowest point in tapered chamber 70 in order to maintain the desired pressure in chamber 92. manifold 118 in the first stage of module 20 supply the four sets of nozzles 68 shown in FIG. 11, and venturi wash and spray nozzles to be described, through harness pipes 125 in FIGS. 4A and 21. Cleaning solution is supplied to the manifold by a pipe 126 under the control of solenoid valve 128, rinse water is supplied by pipe 130 under the control of solenoid valve 132 and air under pressure is supplied by pipe 134 under the control of solenoid valve 136.

The cleaning solution valve 128 is opened for an interval of 30 seconds by a timer 138, the rinse water valve 132 is opened for an interval of 30 seconds by a timer 140 and the air valve 136 is opened for an interval of 30 seconds by a timer 142. These timers are activated in sequence by a master timer 144 which has an operating cycle of two minutes and 30 seconds.

The operation of master timer 144 is initiated by switch 147 in a relay 146 controlled by venturis and vacuum sensors to be described. A power supply line 148 operates the timers 138, 140 and 142 and master timer 144, and a power supply 150 operates the three solenoid valves 128,132 and 136. The circuit 152 is controlled by the vacuum sensors mentioned above, through a programmable alternating control system 328. At the start of a cleaning cycle a second master timer 306 reduces the speed of the separator deflectors 42 and 44 to 20 r.p.m. and at the completion of the cycle returns the speed to normal operating speed. These controls will be described. manifold 118 in the first stage of module 20 supply the four sets of nozzles 68 shown in FIG. 11, and venturi wash and spray nozzles to be described, through harness pipes 125 in FIGS. 4A and 21. Cleaning solution is supplied to the manifold by a pipe 126 under the control of solenoid valve 128, rinse water is supplied by pipe 130 under control of solenoid valve 132 and air under pressure is supplied by pipe 134 under the control of solenoid valve 136.

The cleaning solution valve 128 is opened for an interval of 30 seconds by a timer 138, the rinse water valve 132 is opened for an interval of 30 second by a timer 140 and the air valve 136 is opened for an interval of 30 seconds by a timer 142. These timers are activated in sequence by a master timer 144 which has an operating cycle of two minutes and 30 seconds.

The operation of master timer 144 is initiated by switch 147 in a relay 146 controlled by venturis and vacuum sensors to be described. A power supply line 148 operates the timers 138, 140 and 142 and master timer 144, and a power supply 150 operates the three solenoid valve 128, 132 and 136. The circuit 152 is controlled by the vacuum sensors mentioned above, through a programmable alternating control system 328. At the start of a cleaning cycle a second master timer 306 reduces the speed of the separator deflectors 42 and 44 to 20 r.p.m. and at the completion of the cycle returns the speed to normal operating speed. These controls will be described.

Figure 11:
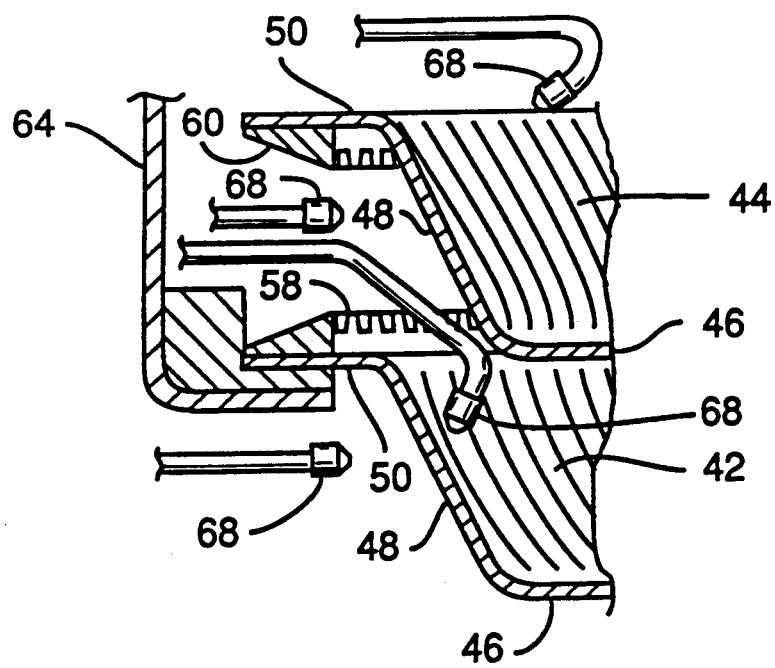
FIG. 11 is a sectional view on the line 11—11 in FIG. 7.
Figure 18A:
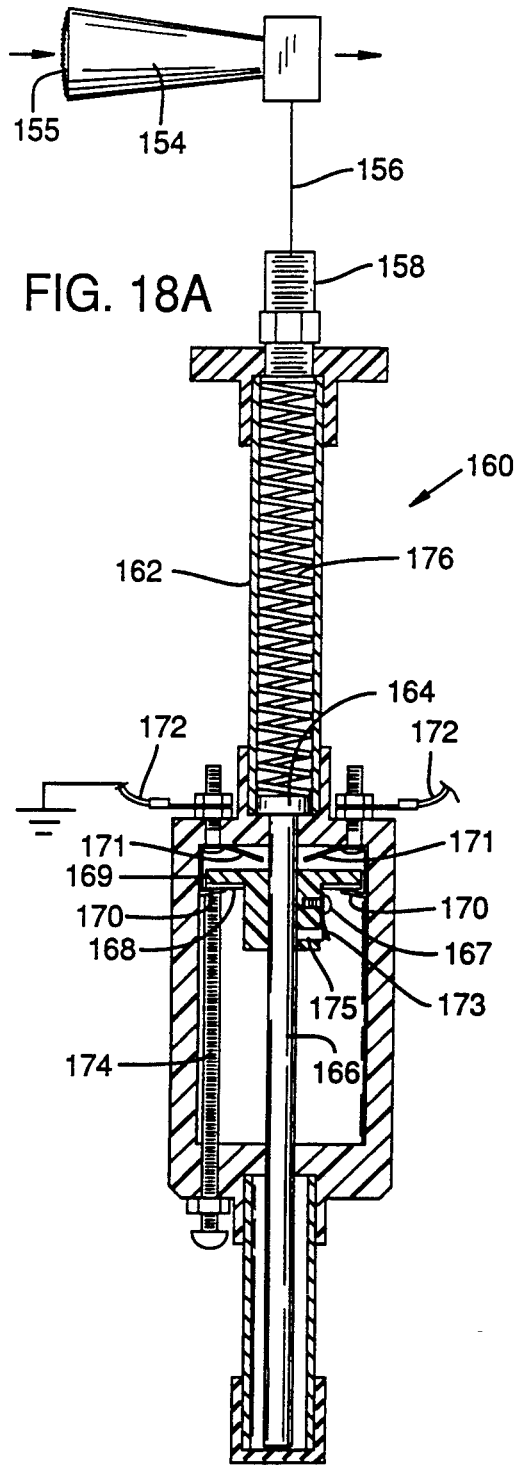
FIG. 18A is an enlarged sectional view of one of the vacuum sensors in FIG. 14 showing the parts in open circuit position.
Figure 18B:
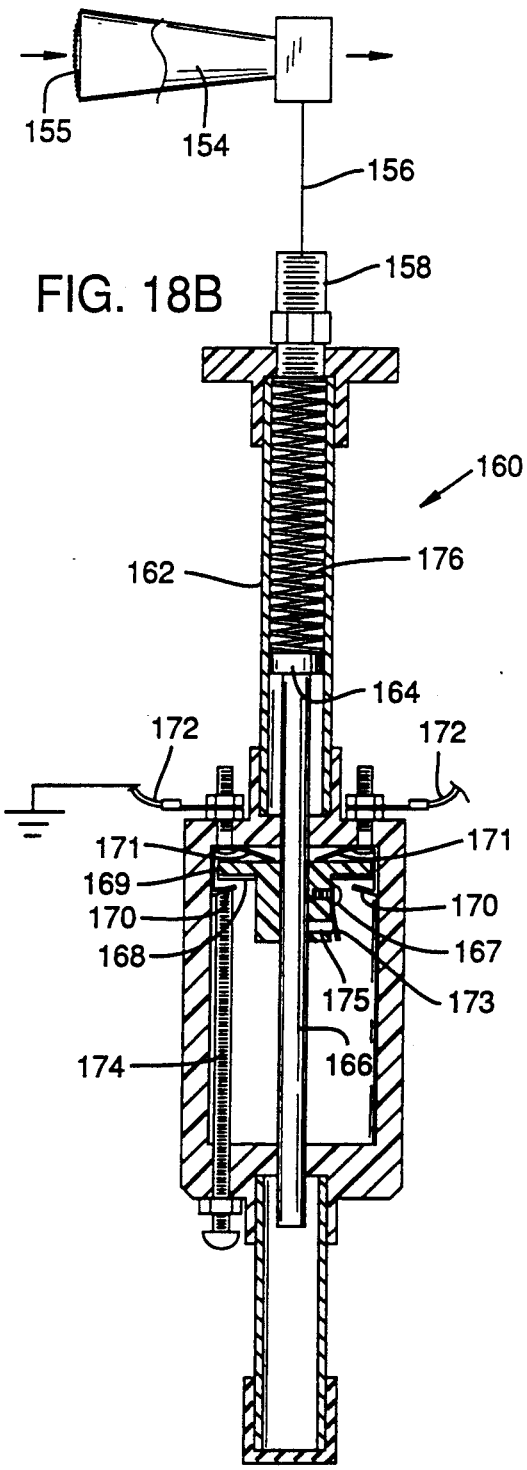
FIG. 18B is a similar view showing the parts in different positions.

The wash cycle for the separator deflectors 42 and 44 in FIGS. 8 and 11 is activated by a plurality of air/gas venturis and vacuum sensors as shown in FIGS. 18A and 18B. The air/gas venturi 154 having an inlet screen 155 is connected through a tube or pipe 156 to a connection 158 on the vacuum sensor 160. Connection 158 communicates with one end of cylinder 162 containing a piston 164 on piston rod 66.

A bridging contact disc 168 on an insulating disc 169 is adjustably mounted on piston rod 166 by screw 167 to close a circuit between a pair of contacts 170 connected to circuit wires 172. The movement of the disc 169 and bridging contact 168 toward contacts 170 is stopped by an adjustable stop screw 174 behind one of the contacts 170. Contacts 170 have spring ends 171 to stop the upward movement of disc 169. Screw 167 holds a leaf spring 173 against a pin 175 frictionally engaging piston rod 166, allowing the piston rod to slide through disc 169.

Piston 164, piston rod 166 and disc 169 are pressed downward toward the stop screw 174 by compression spring 176 in cylinder 162 as shown in FIG. 18A. In normal operation the air/gas pressure in pipe 156 from venturi 154 sufficiently reduces the pressure in cylinder 162 to overcome the compressive force of spring 176 so that piston 164 moves upward causing bridging contact 168 to open the circuit through contacts 170 as shown in FIG. 18B. When an accumulation of particulate matter on screen 155 reduces the vacuum in the venturi the increase in pressure in cylinder 162 closes the circuit through bridging contact 168 to start a cleaning cycle. Stop screw 174 limits the downward movement of parts 168, 169 to avoid damage to the flexible contact fingers 170.

FIGS. 18A and 18B show the wide range of adjustment available for use under different pressure conditions either in the vacuum sensors themselves or atmospheric pressures ranging from elevations below sea level to very high elevations above sea level. Each vacuum sensor is adjusted in installation according to the atmospheric pressure at the location where it will be used.

Figure 19:
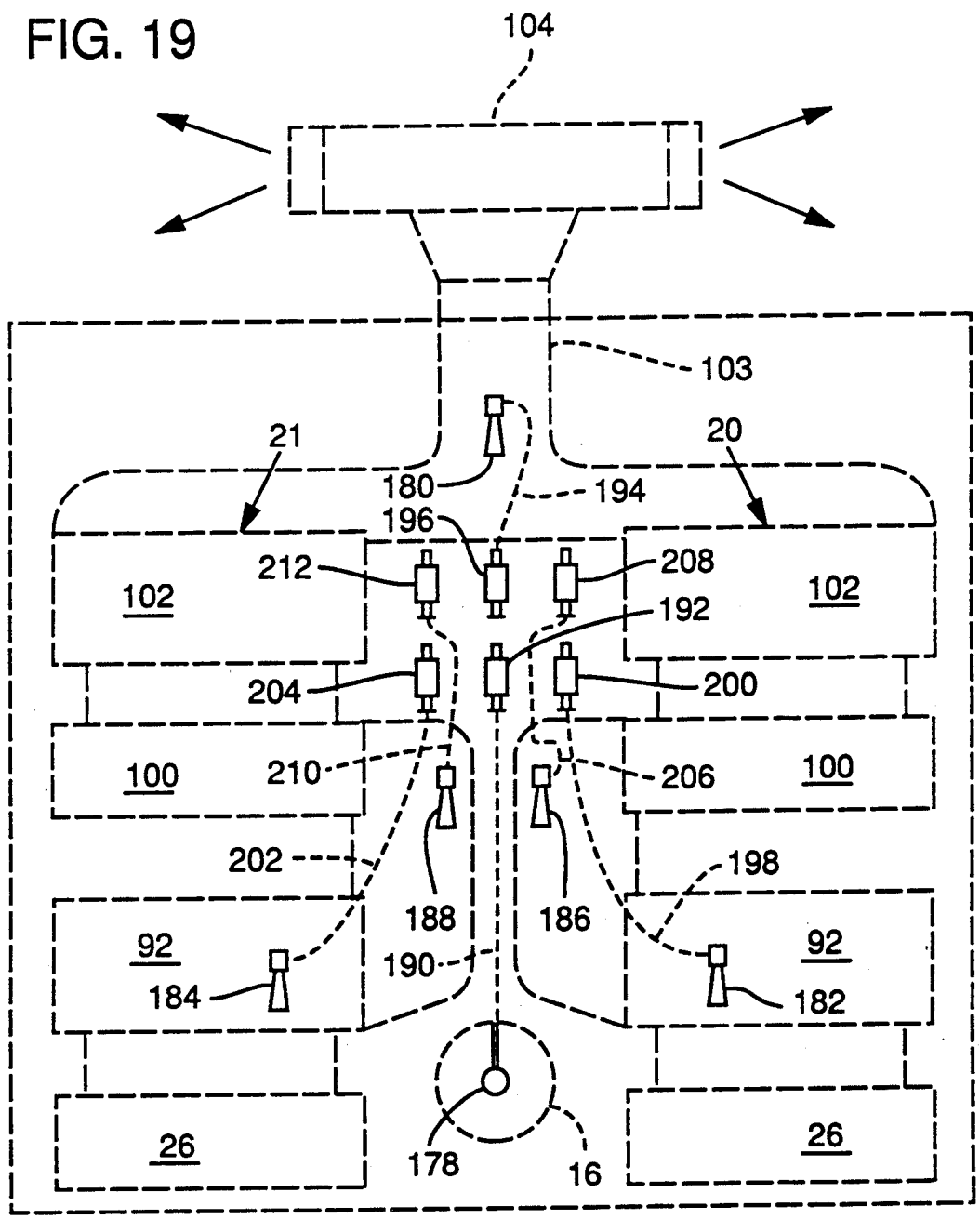
FIG. 19 is a front diagrammatic view of the two modules showing the positions of the air venturis.
Figure 20:
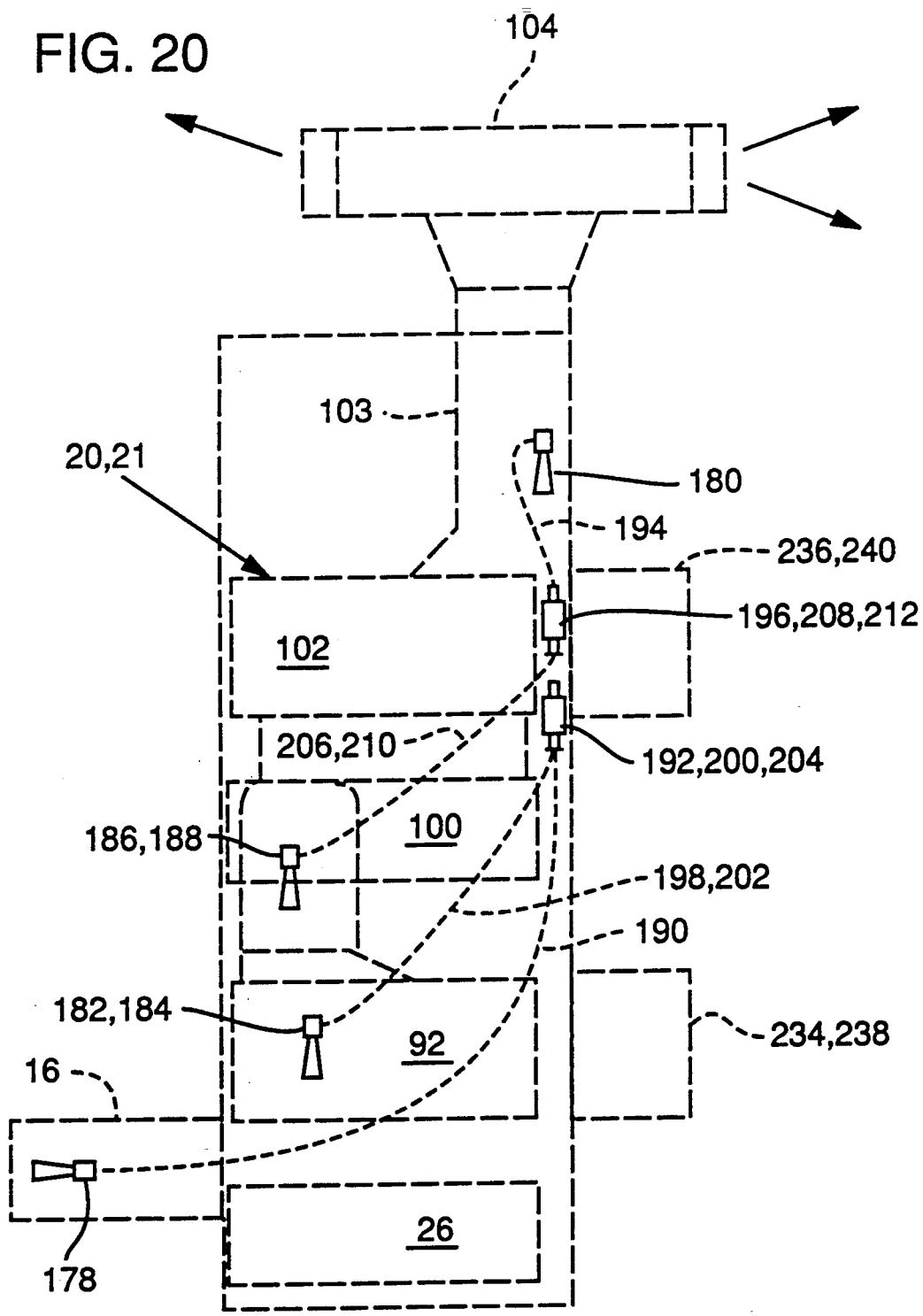
FIG. 20 is a similar side view showing the positions of the air venturis in the two modules.

FIGS. 19 and 20 diagrammatically show in one front view and one side view the locations of the venturis in the two modules 20 and 21. Venturi 178 is in the common air/gas inlet 16 for both modules and venturi 180 is in the common duct 103 leading to the outlet 104 for both modules. Venturi 182 in module 20 and 184 in module 21 are in the pressurized collector chamber areas and venturi 186 in module 20 and 188 in module 21 are in the upper ends of passageways 94 in FIG. 15A leading to the upper section of each module.

Venturi 178 is connected through vacuum line 190 to vacuum sensor 192 and venturi 180 is connected through vacuum line 194 to vacuum sensor 196. Venturi 182 is connected through vacuum line 198 to vacuum sensor 200 and venturi 184 is connected through vacuum line 202 to vacuum sensor 204. Venturi 186 is connected through vacuum line 206 to vacuum sensor 208 and venturi 188 is connected through vacuum line 210 to vacuum sensor 212. All the vacuum sensors are contained in a housing outside of the modules.

As will be explained hereinafter these vacuum sensors operate to control the initiation of the cleaning cycle involving the spraying of cleaning solution, rinse water and drying air through the nozzles 68 in FIG. 11 as previously described with reference to FIG. 22.

Figure 21:
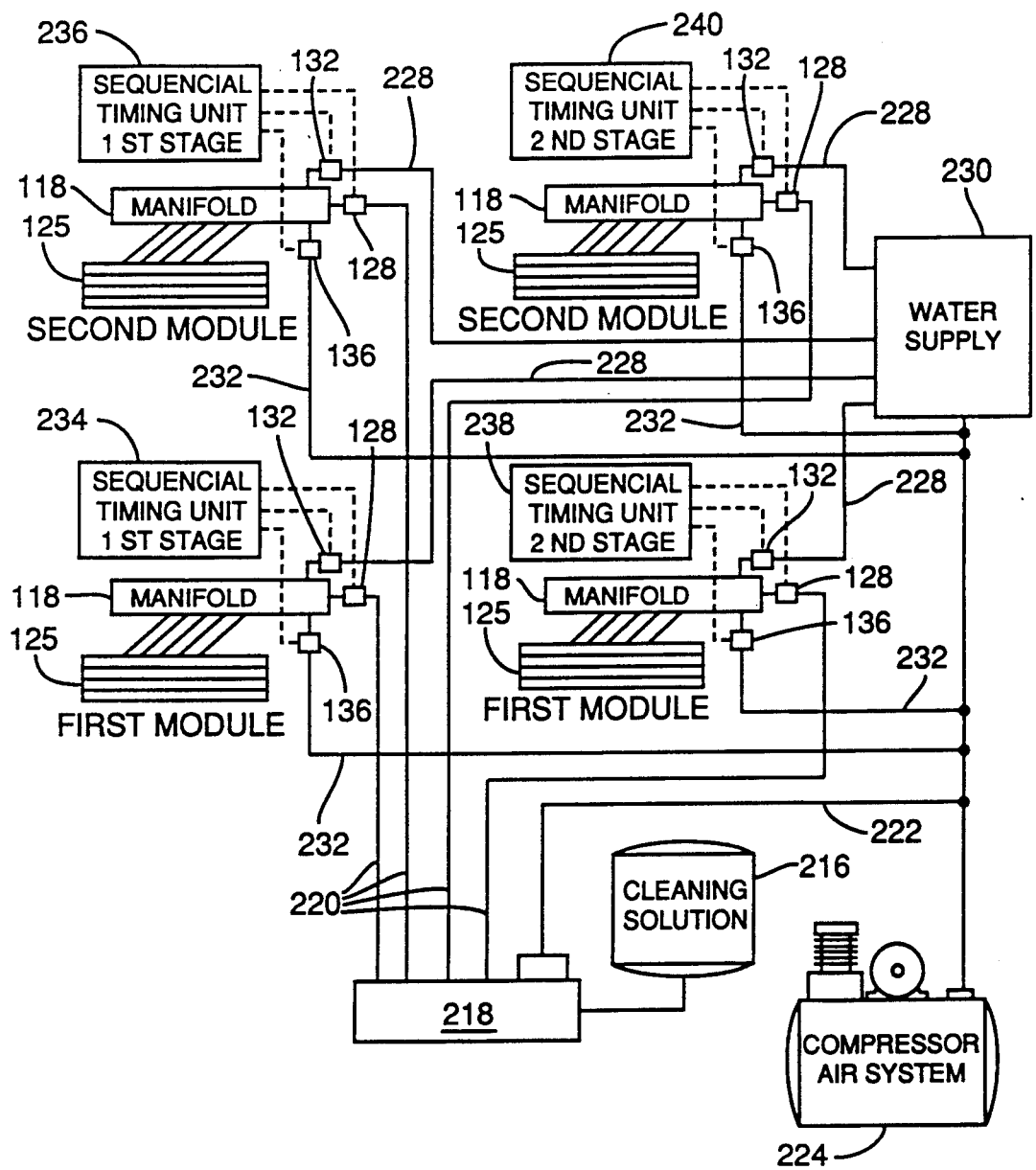
FIG. 21 is a general diagram of the control system for the wash cycles for the separator deflectors in the first and second stages of the two modules.

The nozzles 68 are supplied by the manifold 118 through harness 125 and solenoid valves 128, 132 and 136 in FIG. 21. In the first phase of the cleaning cycle cleaning solution from tank 216 flows through distribution pipe 218 and pipe 220 to the valve 128, propelled by air through pipe 222 from air compressor 224.

After 30 seconds valve 128 is closed by sequential timing unit 234 which then opens valve 132 to supply rinse water through pipe 228 from water supply tank 230 to wash out the cleaning solution. Then after 30 seconds the sequential timing unit 234 closes valve 132 and opens valve 136 for 30 seconds to supply an air flow through pipe 232 directly from the air compressor 224 for the drying phase of the cleaning cycle. The cleaning cycles are the same for the first and second stages of both modules in FIG. 21. These piping connections will not be described in detail.

Figure 14:
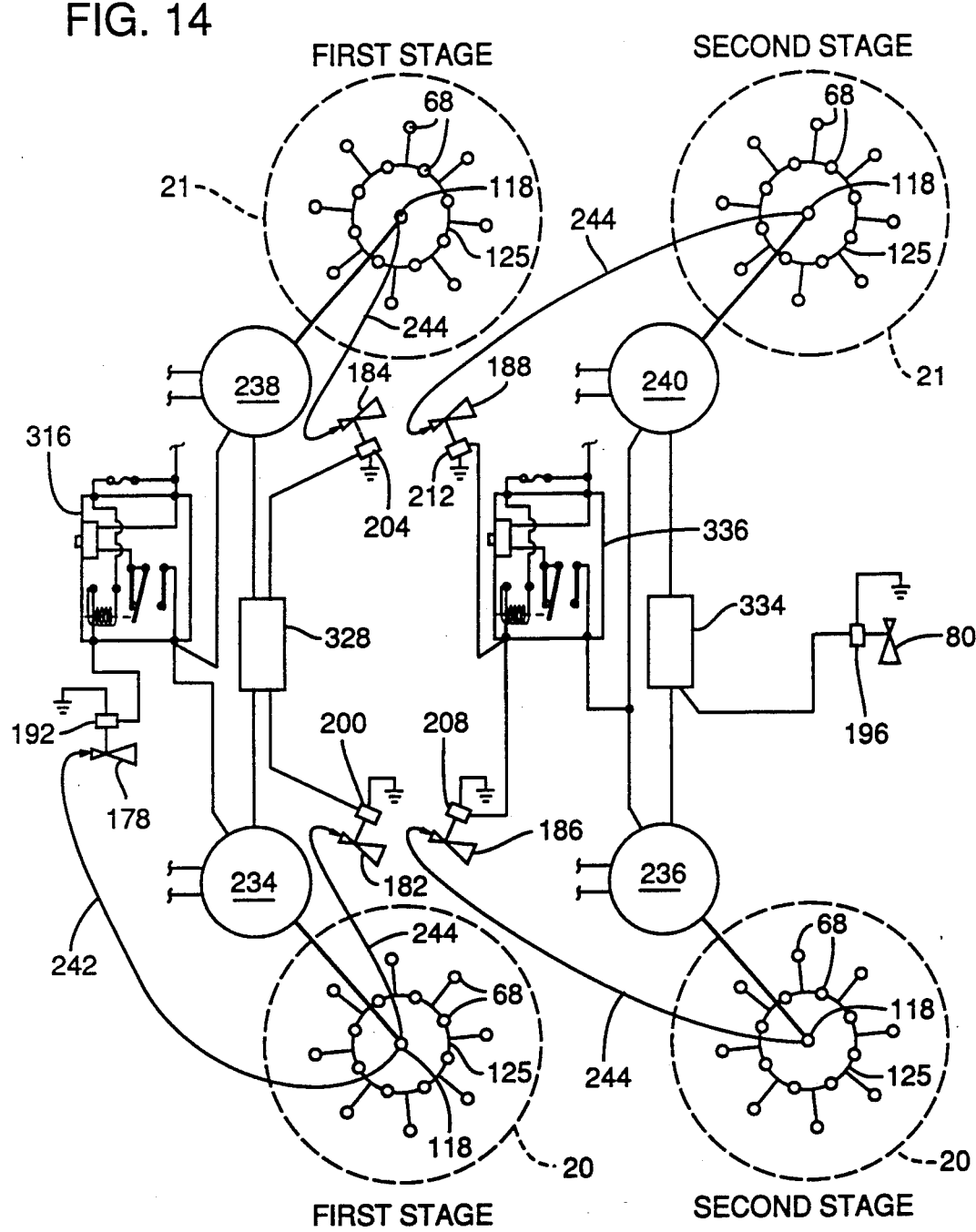
FIG. 14 is a schematic diagram of the control of the initiation of the wash cycles in the first and second stages in the two modules by certain venturis and vacuum sensors, and the pressure wash spray control system for the nozzles in FIG. 7.

In FIG. 14 the sequential timing unit 234 described in reference to FIG. 22 controls the wash cycle for the first stage of the first module 20. The sequential timing unit 236 operates in the second stage of the first module, sequential timing unit 238 operates in the first stage of the second module 21 and sequential timing unit 240 operates in the second stage of the second module.

Air venturi 178 in inlet 16 controls vacuum sensor 192 to provide a measure of particulate contaminated air/gas inflow. Venturi 182 in the approach to the outlet of pressure collector chamber 92 in FIG. 5A similarly controls vacuum sensor 200. These values are compared in a computer associated with sequential timing units 234 and 236 to measure the reduction of air/gas flow through venturi 178 resulting from the accumulation of buildup of solid material on the separator deflectors 42, 44. When excessive contamination accumulation is indicated, the wash and air spray cycle described in connection with FIG. 22 is activated.

Also in this cycle pipe lines 242 and 244 in FIG. 14 supply nozzles to clean the two venturis with liquids and air from outlet 124 in manifold 118 in FIG. 22. The wash cycle controls for the second stage in the first module and both stages in the second module are similar to the foregoing description with reference to further details in FIGS. 22 and 23.

Figure 12:
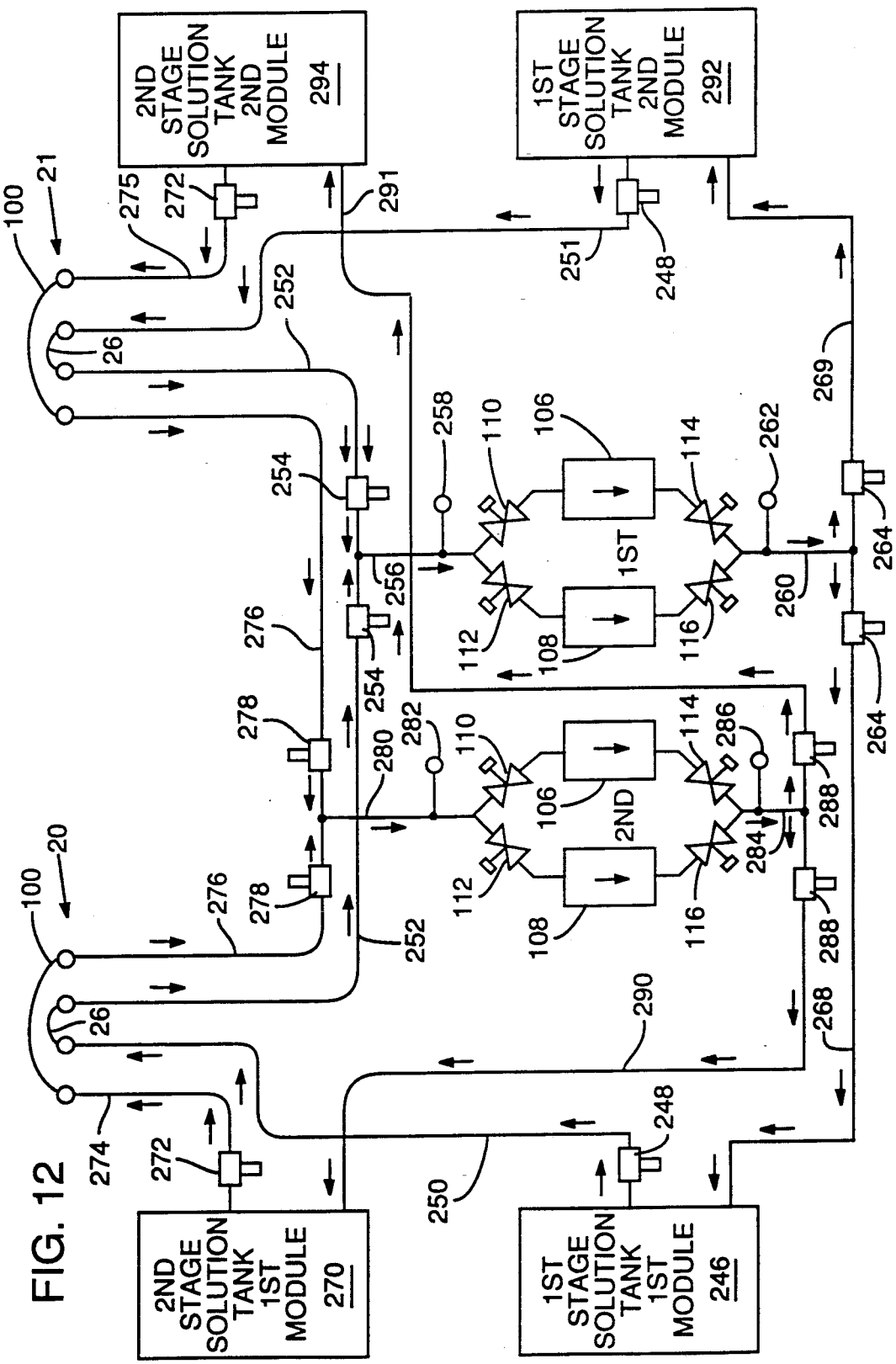
FIG. 12 is a schematic view of the piping arrangement for a neutralizing solution for the two modules through filter cartridge packages to the recovery distribution tanks.
Figure 13:
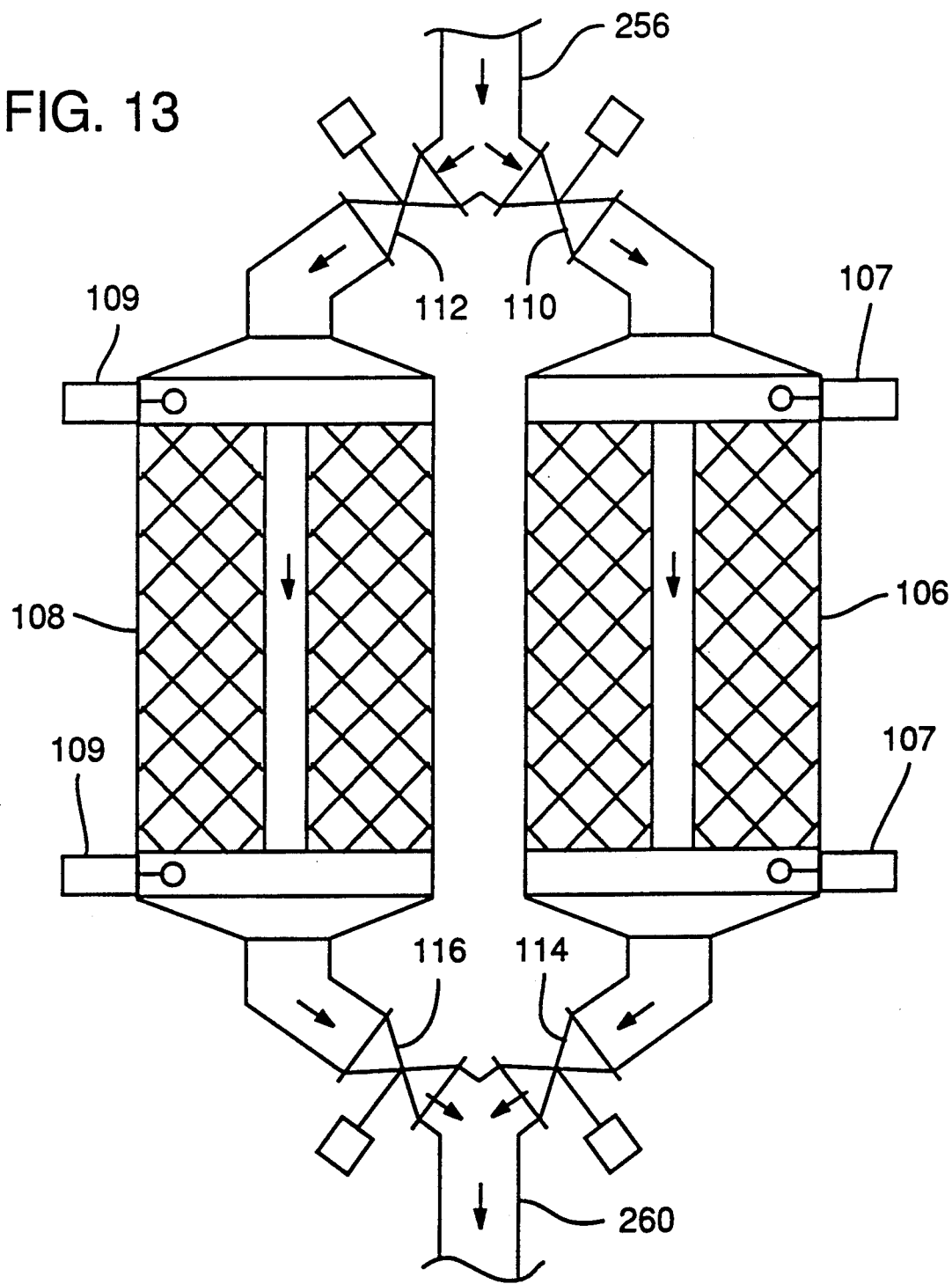
FIG. 13 is a schematic diagram of a typical filter cartridge package in FIG. 12.

FIG. 12 is a diagram of the pipelines conveying the liquid cleaning solution 24 in first stage reservoir 26 and solution 25 in second stage reservoir 100 in FIG. 3 and includes the second module 21. First stage reservoir 6 in the first module 20 is supplied from solution tank 246 by booster pump 248 and pipeline 250. The solution is circulated out of reservoir 26 through discharge pipeline 252 by discharge pump 254 to a pipeline 256. This pipeline connects to the two filters 106 and 108 through the normally open manually actuated solenoid valves 110 and 112 as also shown in FIG. 13. Pipeline 256 is also connected to a conventional type of liquid flow sensor 258.

The outflows from filters 106 and 108 are similarly passed through manually actuated normally open solenoid valves 114 and 116 to a common pipeline 260 which is also connected to a conventional type of liquid flow sensor 262. From pipeline 260 a return flow booster pump 264 passes the filtered solution back through pipeline 268 to the first stage solution tank 246 for the first module 20.

In a similar manner solution from the second stage solution tank 270 for the first module 20 is pumped by booster pump 272 through pipeline 274 to the second stage reservoir 100 in the first module 20. Solution is removed from reservoir 100 through pipeline 276 by discharge pump 278 which passes the flow to a pipeline 280 through a pair of normally open manually actuated solenoid valves and a pair of filters the same as described in connection with the discharge from the first stage reservoir 26. Pipeline 280 is connected to a conventional liquid flow sensor 282 and discharge pipeline 284 is connected to a conventional liquid flow sensor 286. The flow in pipeline 284 is returned by booster pump 288 through pipeline 290 to the second stage solution tank 270 for the first module 20.

In normal operation, all the valves 110, 112, 114 and 16 are open to pass the solution from both the first stage reservoir 26 and second stage reservoir 100 back to their respective solution tanks 246 and 270 in the first module 20. When the liquid flow sensors 282, 286, 258 and 260 indicate, by signal lights, reduced flows as a result of excessive accumulation of contaminants, the manual valves 110, 112, 114, 116 for one of the filters are closed for replacement of that filter, while the other filter of the pair remains in operation. Then the solution flow is diverted through the new filter while the other filter is being replaced. After both filters of a pair have been replaced, solution flow is restored through both filters.

The operation of the solution filter system for the second module is the same as just described for the first module. There may be any number of pairs of such modules as may be needed to handle the pollution load in a particular installation. FIG. 12 includes a solution tank 292 for the first stage and a solution tank 294 for the second stage of the second module. The first stages in both modules share one pair of filters and the second stages share the other pair. Solution tank 292 is served by pipelines 251 and 269 and tank 294 is served by pipelines 251 and 269 and tank 294 is served by pipelines 275 and 291.

As the pollution control system is in operation for a period of time, venturi 178 in the inlet 16 begins to accumulate an emission buildup of particulates and residues on the screen 155 of the venturi in FIGS. 18A and 18B. When this accumulation starts to close off the flow to the orifice in the venturi, the degree of vacuum in the venturi is reduced in the vacuum line 190 and sensor 192, causing the increase of pressure in the sensor to close its circuit to relay switch 316 in FIG. 22 in the circuit 148 for the startup operation of the cleaning cycle for the nozzles 68.

This relay switch is connected to a power line 317. The relay is manufactured by Synchro-Start Products, Inc. in Skokie, Ill.

Venturis 182 and 184 located in the pressure collector chambers 92 in the two modules similarly respond to any accumulation of particulates and residues that have passed through the first stage of the cleaning operation, closing the switches in the sensors 200 and 204. This closes circuits 324 and 326 to a relay circuit inside a programmable alternating control system 328 that starts operation of one or the other of the cleaning systems sequential timing units 234 or 236 in the first stages of the two modules. This programmable alternating control system 328, powered by a supply source 329, controls the cleaning cycle operations of the first and second modules. The system 328 is manufactured by Texas Instruments, Inc.

When the programmable alternating control system 328 starts operation it selects the appropriate module 20 or 21, only one module being cleaned at a time. After the programmable alternating control system 328 selects one module, it closes relay switch 146, 147 inside the sequential timing unit 234 or 236 which starts its master timer 144. Timer 144 activates the cleaning cycle as previously described.

Timer 306, started by relay switch 147, controls relaty switch 304 to slow down the speed of drive motor 66 from 3600 r.p.m. to 20 r.p.m. The motor is switched from full power circuit 300, 308 to resistor circuit 314, 312, 310. When the cleaning cycle is completed, timer 306 operates relay 304 to return motor 66 to normal operating speed. The control of motor 67 in the second module is the same.

The first stage system also activates the second stage system simultaneously for complete one module cleaning. Circuit wires 330 and 332 connect programmable alternating control system 328 with the corresponding wires in system 334 in FIG. 23 for cleaning the second stage of the module selected by system 328.

A second stage backup system in FIG. 23 utilizes venturis 186 and 188 in the two modules, located in the air passage tube 94 in FIG. 15a. As the air/gas cleaned in the first stage enters into the air passage tube 94 it passes by venturis 186 and 188. Any accumulation of particulates and residues starts to close off the flow to the orifices in these venturis which in turn reduces the vacuum in the vacuum lines 206 and 210 between the venturis and the vacuum sensors 208 and 212. As the degree of vacuum begins to drop in the sensors, these sensors close their switches to wires 209 and 213 to relay switch 336 in FIG. 23 in the circuit 148 for the startup operation.

Venturi 180 located in the outlet flue 103 receives the final passage of clean air before discharge from the modules. Should an accumulation occur, restricting the air flow to the orifice in venturi 180, this in turn will close the switch in sensor 196 by reduction of vacuum in line 194. This action signals the programmable alternating control system 334 through wire 197 to select and activate sequential timing units 234, 236, 238 and 240 in sequence, module 20 first and then module 21, to activate the cleaning cycles for the first and second stages of module 20 and then the first and second stages of module 21. The system 334 is manufactured by Texas Instruments, Inc.

Thus the backup system in FIG. 23 provides a safety feature to insure the washing of separator deflectors 42 and 44 in the event of failure of the primary control system in FIG. 22.

When there are more than two modules, the cleaning cycles for each additional pair are controlled as shown in FIGS. 22 and 23.

What is claimed is:

1. The method of removing contaminants from a gas comprising drawing a stream of the contaminated gas under the surface of a liquid neutralizing solution in a reservoir, agitating the solution in said reservoir with an oscillating diffuser vane unit, drawing said gas from said reservoir through a pair of counter rotating separator deflectors, and returning any solution expelled from said separator deflectors back to said reservoir.

2. The method of claim 1 including the preliminary step of cooling said gas before it is introduced into said solution.

3. The method of claim 2 wherein said cooling is accomplished by injecting cold air into said stream of gas.

4. The method of claim 1 including the further steps of passing the gas through a series of counter rotating blower fans in a fan chamber and blowing the gas into a collector pressure chamber.

5. The method of claim 4 wherein said fan chamber is a tapered venturi restrictor chamber.

6. The method of claim 5 providing the first stage in a two stage operation having a second stage the same as said first stage, and passing the air/gas through an electronic air cleaner between said first and second stages 7. The method of claim 6 including providing a spray and air wash cycle for cleaning said separator deflectors in said first and second stages.

8. In the method of claim 7, said spray and air wash cycle comprising the steps of first reducing the speed of said separator deflectors, then spraying cleaning solution on said separator deflectors, then spraying rinse water on said separator deflectors, then blowing air on the separator deflectors to dry the separator deflectors and then returning the separator deflectors to normal operating speed.

9. The method in claim 8 including providing an air venturi in the stream of incoming contaminated gas and an air venturi in the flow of gas to said electronic air cleaner, and measuring the air pressures in said two venturis to indicate an excessive accumulation of solid contaminates on said separator deflectors and start said spray and air wash cycle.

10. The method of claim 9 including providing vacuum sensors operated by said venturis, and adjusting said vacuum sensors according to the altitude above or depth below mean sea level.

11. The method of claim 10 including providing wash nozzles for said venturis and operating said wash nozzles in said wash cycles for said separator deflectors.

12. The method of claim 11 including providing air venturis in the incoming and outgoing flows of gas into and out of said second stage of operation and measuring the vacuums in said venturis to determine excessive contamination in said second stage.

13. The method of removing contaminants from a gas comprising providing a pair of modules in which each module performs the two stages of operations specified in claim 6, including dividing the inlet stream of contaminated gas between the two modules and combining the outlet flows of cleaned gas from the two modules.

14. The method of claim 13 including providing a plurality of pairs of said modules, providing air venturis and vacuum sensors operated by said venturis in said modules to initiate said spray and air wash cycle in a module needing cleaning, and then performing said spray and air wash cycle in the remaining modules one after another.

15. A gas pollution control apparatus comprising a reservoir containing a liquid neutralizing solution, an oscillating diffusor vane unit in said reservoir to agitate said solution, an inlet for discharging contaminated gases under the surface of said solution, a pair of coaxial counter rotating separator deflectors above said solution, and means for passing a gas flow through said inlet, said solution and said separator deflectors.

16. Apparatus as defined in claim 15 including a cooler for cooling the air/gas flow approaching said inlet.

17. A system as defined in claim 15 including means for circulating said solution through a filter.

18. The apparatus defined in claim 15, one of said separator deflectors being connected to a drive shaft, the other separator deflector being mounted for rotation in closely adjacent relation to said one separator deflector, gear teeth around the periphery of said one separator deflector facing gear teeth around the periphery of said other separator deflector, and pinion gears in fixed locations between said two separator deflectors driving said other separator deflector in a direction of rotation opposite the rotation of said one separator deflector.

19. An air pollution control apparatus as defined in claim 15, each of said separator deflectors having a circular shape with an imperforate bottom wall, a peripheral side wall inclined outward from the periphery of said bottom wall, and slotted corrugations in said side wall.

20. The apparatus defined in claim 15 including a series of coaxial counter rotating blower fans in a fan chamber above said separator deflectors.

21. The apparatus defined in claim 20, said fan chamber being a tapered venturi restrictor chamber.

22. Apparatus as defined in claim 20 including a collector pressure chamber receiving the gas flow from said fan chamber.

23. Apparatus as defined in claim 15 including an electronic air cleaner receiving the gas flow from said separator deflectors.

24. The apparatus defined in claim 22 being the first stage in a two stage module having a second stage the same as said first stage, and an electronic air cleaner passing the gas flow from said first stage to said second stage.

25. The apparatus of claim 24 including spray nozzles for cleaning and drying said separator deflectors in both stages in a spray and air wash cycle.

26. The apparatus of claim 25 including an air venturi in said inlet and an air venturi in the gas flow from said collector pressure chamber, vacuum sensors responsive to said venturis, and means responsive to said vacuum sensors to initiate said spray and air wash cycle.

27. The apparatus in claim 26 including wash nozzles for said venturis operable in said wash cycles.

28. The apparatus in claim 26, each vacuum sensor comprising a cylinder having an air line connection with an orifice in its associated venturi, a piston rod having a piston in said cylinder depressed by a spring, a pair of electrical contacts, a bridging contact of said piston rod arranged to close a circuit between said air of contacts in response to an increase in air pressure in said associated air venturi, the position of said bridging contact being adjustable on said piston rod, and an adjustable stop to limit the movement of said bridging contact.

29. The apparatus in claim 26, including a sequential timing unit to control said spray and air wash cycle, said unit comprising a master automatic reset timer to control the overall time allowance for the spray and air wash cycle, a timer actuated at the initiation of operation of said master timer to slow the speed of rotation of said separator deflectors, a timer controlled by said master timer controlling a spray wash operation with a cleaning solution, a timer controlled by said master timer controlling a rinse water spray, and a timer controlled by said master timer controlling an air drying operation, the speed control timer returning the rotation of said separator deflectors to normal operating speed after said air drying operation.

30. The apparatus in claim 29, said sequential timing unit operating in said first stage of operation.

31. The apparatus in claim 30 including a two stage second module similar to the module described, and a sequential timing unit controlling a spray and air wash cycle for the first stage of operation in said second module.

32. The apparatus in claim 31 including sequential timing units controlling spray and air wash cycles in the second stages of both modules, and air venturis in the inlets and common outlet of the second stages of both modules to initiate the operation of said second stage sequential timing units.

33. A pair of separator deflectors, each separator deflector having a circular pan shape with an inperforate bottom wall, a peripheral side wall inclined outward from the periphery of said bottom wall and slotted corrugations in said side wall to pass gas inward through said slot, said separator deflectors being spaced close together in coaxial nesting relation, and means driving said separator deflectors in opposite directions of rotation.

34. In the combination of claim 33, a drive shaft supporting said separator deflectors and driving one of the separator deflectors, and pinion gears engaging gear teeth on the peripheries of the separator deflectors to drive the other separator deflector in a direction of rotation opposite that of said one separator deflector.

* * * * *

UNITED STATES PATENT AND TRADEMARK OFFICE
CERTIFICATE OF CORRECTION

PATENT NO. : 5,061,299                                             Page 1 of 4

DATED     : October 29, 1991

INVENTOR(S) : Sidney D. Porter, III, et al

It is certified that error appears in the above-identified patent and that said Letters Patent is hereby corrected as shown below:

ON TITLE PAGE:

In the title and at the top of column 1, change "PARTICAL" to --PARTICLE--.

Figure 4E:
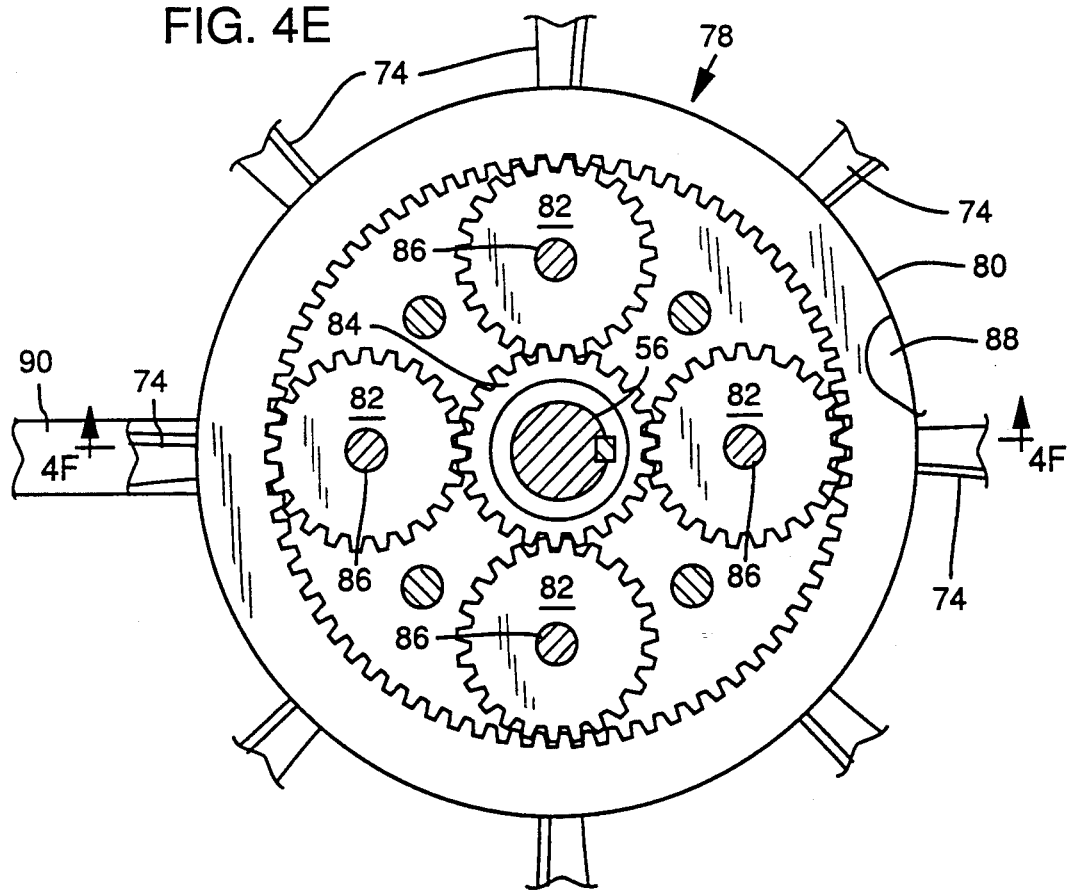
FIG. 4E is an enlarged view on the line 4E—4E in FIG.

Column 2, rewrite lines 54 (begining with "FIG. 4E") through 66 as follows:

Fig. 4E is an enlarged view on the line 4E-4E in Fig. 4A.

Figure 4F:
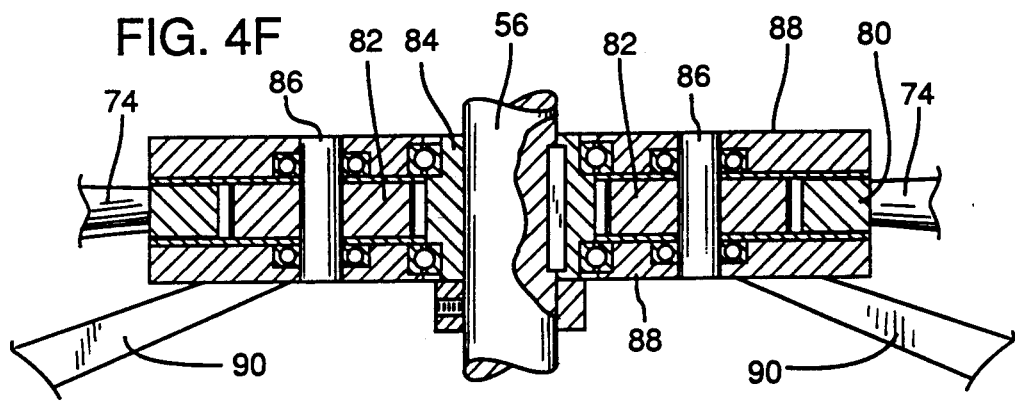
FIG. 4F is a sectional view on the line 4F—4F in FIG.

Fig. 4F is a sectional view on the line 4F-4F in Fig. 4E.

Fig. 5 is an enlarged sectional view on the line 5-5 in Fig. 4A.

Figure 6:
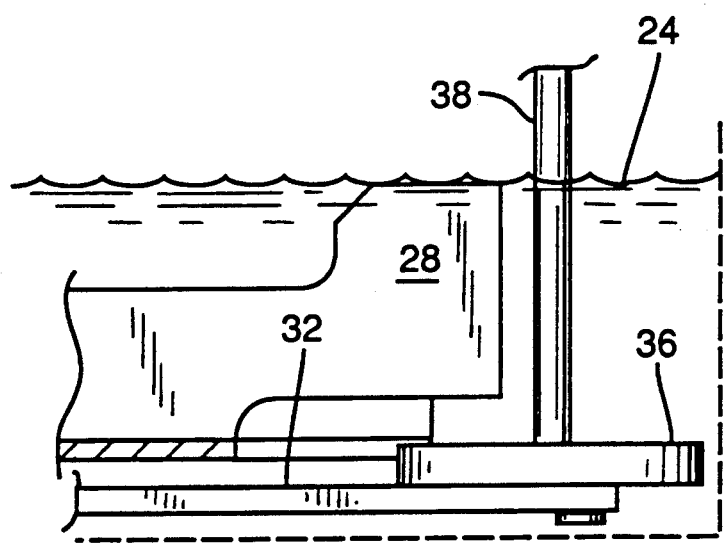
FIG. 6 is a sectional view on the line 6—6 in FIG. 5.

Fig. 6 is a sectional view on the line 6-6 in Fig. 5.

Fig. 7 is a sectional view on the line 7-7 in Fig. 8.

Fig. 8 is a sectional view on the line 8-8 in Fig. 7.

Fig. 9 is a view on the line 9-9 in Fig. 8.

Fig. 10 is a sectional view on the line 10-10 in Fig. 8.

Fig. 11 is a sectional view on the line 11-11 in Fig. 7.

UNITED STATES PATENT AND TRADEMARK OFFICE
CERTIFICATE OF CORRECTION

PATENT NO. : 5,061,299

DATED : October 29, 1991

INVENTOR(S) : Sidney D. Porter, III, et al

It is certified that error appears in the above-identified patent and that said Letters Patent is hereby corrected as shown below:

Fig. 12 is a schematic view of the piping arrangement for a neutralizing solution for the two modules through 15 filter cartridge packages to the recovery distribution tanks.

Column 4, line 60, before "manifold" insert the following:
-- From the electronic filter 96 passageway 94 continues upward to the second section of the module where the air/gas flow is submerged under the surface of the liquid neutralizing solution 25 in the upper reservoir 100 in Fig. 3. As previously stated, the upper section of the module is the same as the lower section described above, containing a reservoir 100 for liquid neutralizing solution 25, oscillating solution agitator 28, counterrotating separator deflectors 42 and 44, tapered venturi restrictor chamber 70 containing counterrotating propellers 72, 74 and 76, and collector pressure chamber 102. The final passageway 103

UNITED STATES PATENT AND TRADEMARK OFFICE
CERTIFICATE OF CORRECTION

PATENT NO. : 5,061,299

DATED : October 29, 1991

INVENTOR(S) : Sidney D. Porter, III, et al

It is certified that error appears in the above-identified patent and that said Letters Patent is hereby corrected as shown below:

leads to fresh air distributor 104 which carries the flows from all the modules in operation.

Fig. 13 illustrates the filter cartridge assembly package for the liquid neutralizing solution 24 in the lower reservoir 26 in Fig. 3, there being a similar filter cartridge assembly package for the solution 25 in upper reservoir 100. There are two filter cartridges 106 and 108, with handles 107 and 109, which are both in use in normal operation but which may be used individually under the control of inlet solenoid valves 110 and 112. The outlet flow is controlled by solenoid valves 114 and 116. The control of these valves will be described later in connection with the operation of the system.

Fig. 22 illustrates the control mechanisms for the wash cycle for the separator deflectors 42 and 44 in the first stage of each module 20 and 21 utilizing the nozzles 68 in Figs. 7 and 11. Outlet connections 120, 122 and 124 for

UNITED STATES PATENT AND TRADEMARK OFFICE
CERTIFICATE OF CORRECTION

PATENT NO. : 5,061,299

DATED : October 29, 1991

INVENTOR(S) : Sidney D. Porter, III, ET AL

It is certified that error appears in the above-identified patent and that said Letters Patent is hereby corrected as shown below:

Column 5, beginning with "manifold" in line 20, cancel lines 20 through 49

Column 5, line 57, change "66" to --166--.

Column 7, line 27, "6" should be --26--.

Column 7, line 61 "16" should be --116--.

Column 9, line 58 (claim 6, line 3) "air/gas" should be --gas--.

Column 10, line 45 (claim 16, line 2) "air/gas" should be --gas--.

Column 11, line 29 (claim 28, line 6) "air" should be --pair--.

Signed and Sealed this

Thirty-first Day of March, 1992

Attest:

HARRY F. MANBECK, JR.

*Attesting Officer*     *Commissioner of Patents and Trademarks*